(12) United States Patent
Kafle et al.

(10) Patent No.: US 10,122,801 B2
(45) Date of Patent: Nov. 6, 2018

(54) SERVICE DISCOVERY AND TOPOLOGY MANAGEMENT

(71) Applicant: QUALCOMM Incorporated, San Diego, CA (US)

(72) Inventors: Padam Lal Kafle, San Diego, CA (US); Shivraj Singh Sandhu, Milpitas, CA (US); Vijay Naicker Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/198,246

(22) Filed: Jun. 30, 2016

(65) Prior Publication Data

US 2017/0006117 A1    Jan. 5, 2017

Related U.S. Application Data

(60) Provisional application No. 62/188,369, filed on Jul. 2, 2015.

(51) Int. Cl.
| | | |
|---|---|---|
| *H04L 29/08* | (2006.01) | |
| *H04B 17/318* | (2015.01) | |
| *H04W 72/08* | (2009.01) | |
| *H04W 72/04* | (2009.01) | |
| *H04W 76/11* | (2018.01) | |
| *H04W 4/00* | (2018.01) | |

(Continued)

(52) U.S. Cl.
CPC ........ *H04L 67/16* (2013.01); *H04B 17/318* (2015.01); *H04L 65/1069* (2013.01); *H04L 65/4084* (2013.01); *H04L 65/608* (2013.01); *H04L 67/148* (2013.01); *H04W 4/00* (2013.01); *H04W 48/20* (2013.01); *H04W 72/0493* (2013.01); *H04W 72/085* (2013.01); *H04W 76/11* (2018.02); *H04W 84/18* (2013.01); *H04W 4/80* (2018.02); *H04W 8/005* (2013.01); *H04W 24/06* (2013.01); *H04W 76/14* (2018.02); *H04W 84/12* (2013.01)

(58) Field of Classification Search
None
See application file for complete search history.

(56) References Cited

U.S. PATENT DOCUMENTS 9,775,107 B2 * 9/2017 Iwami ................. H04W 48/18
2011/0082940 A1   4/2011 Montemurro et al.
(Continued)

OTHER PUBLICATIONS

ISA/EP, International Search Report and Written Opinion of the International Searching Authority, Int'l Application No. PCT/US2016/040798, dated Sep. 15, 2016, European Patent Office, Rijswijk, NL, 13 pgs.

*Primary Examiner* — Robert C Scheibel
(74) *Attorney, Agent, or Firm* — Holland & Hart LLP

(57) ABSTRACT

Methods, systems, and devices are described for wireless communication. A source device of a wireless local area network (WLAN) may identify one or more attributes of a first wireless link and a second wireless link between the source device and a sink device of the WLAN. The one or more attributes may be compared with a source device connection policy associated with a streaming protocol. The source device may determine whether to establish a streaming session with the sink device over the first wireless link or the second wireless link based at least in part on the comparing.

30 Claims, 14 Drawing Sheets

(51) Int. Cl.
*H04W 48/20* (2009.01)
*H04W 84/18* (2009.01)
*H04L 29/06* (2006.01)
H04W 76/14 (2018.01)
H04W 4/80 (2018.01)
H04W 8/00 (2009.01)
H04W 24/06 (2009.01)
H04W 84/12 (2009.01)

(56) References Cited

U.S. PATENT DOCUMENTS

| | | | |
|---|---|---|---|
| 2013/0324114 A1* | 12/2013 | Raghothaman | H04W 76/023 455/426.1 |
| 2015/0023341 A1 | 1/2015 | Zhao et al. | |
| 2015/0139156 A1* | 5/2015 | Thakur | H04W 76/023 370/329 |
| 2015/0189488 A1* | 7/2015 | Yamashita | H04L 67/12 370/310 |
| 2016/0345254 A1* | 11/2016 | Iwami | H04W 76/02 |
| 2017/0118530 A1* | 4/2017 | Amano | H04N 21/6175 |
| 2017/0353920 A1* | 12/2017 | Iwami | H04W 92/18 |

* cited by examiner

FIG. 3C

| Service Name | Auto Accept | Service Information | Service Status | Network Role | Network Configuration | Deferred Session Response | Discovery Policy | Connection Policy |
|---|---|---|---|---|---|---|---|---|
| 364 | 366 | 368 | 370 | 372 | 374 | 376 | 378 | 380 |

302

SERVICE DISCOVERY AND TOPOLOGY MANAGEMENT

CROSS REFERENCES

The present Application for Patent claims priority to U.S. Provisional Patent Application No. 62/188,369 by Kafle, et al., entitled "SERVICE DISCOVERY AND TOPOLOGY MANAGEMENT FOR MULTIMEDIA STREAMING OVER WI-FI CONNECTIONS," filed Jul. 2, 2015, assigned to the assignee hereof.

BACKGROUND

The following relates generally to wireless communication, and more specifically to managing service discovery and topology for multimedia streaming over wireless local area network (WLAN) connections.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (e.g., IEEE 802.11) network, may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

As mobile devices are used to capture or generate content such as audio, video, or multimedia, users may desire to share content between mobile devices and other devices such as TVs, computers, audio systems, and the like. One approach is for one device (e.g., a sink device) to mirror what is displayed on another device (e.g., a source device). Examples of a source device may include a smartphone, tablet, and the like. Examples of a sink device may include a TV, computer screen, etc. In some applications, the source device may transmit the media stream over a wireless link. For example, a source device and a sink device, each connected to an AP, may communicate with each other via the AP. In another example, a Wi-Fi peer-to-peer network, also known as Wi-Fi Direct, allows wireless devices to directly communicate with each other. Devices within range of each other may discover and communicate directly without involving central access points, or discover each other through the AP. In some cases, a source or sink device may be restricted to communicating either directly (e.g., using Wi-Fi Direct) or indirectly (e.g., via an AP), even though an alternative connection topology may improve the quality of the communication. As such, a wireless device may be unable to search for or switch to an alternative connection topology, or may be unable to determine under what circumstances to switch from one connection topology to another.

SUMMARY

Systems, methods, and apparatuses for managing service discovery and topology for multimedia streaming over wireless local area network (WLAN) including the Wi-Fi peer-to-peer and infrastructure Wi-Fi connections are described. The source device of a WLAN may identify an attribute or attributes of a first wireless link and an attribute or attributes of a second wireless link between the source device and a sink device of the WLAN. The source device may then compare the attributes of the first and second wireless links with a connection policy associated for the source device, where the connection policy is for a streaming protocol. Based on the results of the comparison, the source device may then determine whether to establish a streaming session with the sink device over the first wireless link, or whether to establish a streaming session with the sink device over a second wireless link. The source device may establish the streaming session over the first wireless link. The first wireless link may be an infrastructure wireless link, where the source device and the sink device are communicating via an access point (AP) to which both the devices are connected. The second wireless link may be a peer-to-peer wireless link, where the source device and sink device are directly communicating, for example for a streaming session, without passing data through the AP. The source device may also switch the streaming session between streaming over the first wireless link and streaming over the second wireless link. Whether to switch may be based at least in part on the determining. The source device connection policy may also be modified, and the streaming session may be switched based at least in part on the modified connection policy. The source device may perform throughput tests or monitor link quality and/or feedback for a streaming session, or receive such information or metrics from the sink device. The source device may switch the streaming session between the first wireless link and the second wireless link based at least in part on this information.

The source device may also perform discovery to establish a connection. A service discovery protocol to perform may be determined based at least in part on a source device discovery policy, which may include a supported discovery protocol parameter and a preferred discovery protocol parameter. An application service platform (ASP) session may then be established between the source device and the sink device over the first wireless link. The source device may transmit a streaming session request message to the sink device over the first wireless link to establish the streaming session over the first wireless link. The request message may include a connection policy for the source device, which may then be used to set up the connection between the source device and the sink device.

A method of wireless communication is described. The method may include identifying, at a source device of a WLAN, one or more attributes of a first wireless link between the source device and a sink device of the WLAN and one or more attributes of a second wireless link between the source device and the sink device, comparing the one or more attributes of the first wireless link with a source device connection policy associated with a streaming protocol and the one or more attributes of the second wireless link with the source device connection protocol associated with the streaming protocol, and determining, at the source device, whether to establish a streaming session with the sink device over the first wireless link or the second wireless link based at least in part on the comparing.

An apparatus for wireless communication is described. The apparatus may include a link monitor for identifying, at a source device of a WLAN, one or more attributes of a first wireless link between the source device and a sink device of the WLAN and one or more attributes of a second wireless link between the source device and the sink device, a connection manager for comparing the one or more attributes of the first wireless link with a source device connection policy associated with a streaming protocol and the one or more attributes of the second wireless link with the source device connection policy associated with the streaming protocol, and a streaming session manager for determining, at the source device, whether to establish a streaming session with the sink device over the first wireless link or the second wireless link based at least in part on the comparing.

A further apparatus for wireless communication is described. The apparatus may include a processor, memory in electronic communication with the processor, and instructions stored in the memory and operable, when executed by the processor, to cause the apparatus to identify, at a source device of a WLAN, one or more attributes of a first wireless link between the source device and a sink device of the WLAN and one or more attributes of a second wireless link between the source device and the sink device, compare the one or more attributes of the first wireless link with a source device connection policy associated with a streaming protocol and the one or more attributes of the second wireless link with the source device connection policy associated with the streaming protocol, and determine, at the source device, whether to establish a streaming session with the sink device over the first wireless link or the second wireless link based at least in part on the comparing.

A non-transitory computer-readable medium storing code for wireless communication is described. The code may include instructions executable to identify, at a source device of a WLAN, one or more attributes of a first wireless link between the source device and a sink device of the WLAN and one or more attributes of a second wireless link between the source device and the sink device, compare the one or more attributes of the first wireless link with a source device connection policy associated with a streaming protocol and the one or more attributes of the second wireless link with the source device connection policy associated with the streaming protocol, and determine, at the source device, whether to establish a streaming session with the sink device over the first wireless link or the second wireless link based at least in part on the comparing.

Some examples of the method, apparatuses, or non-transitory computer-readable medium described herein may further include processes, features, means, or instructions for establishing the streaming session over the first wireless link, and switching the streaming session over the first wireless link to the streaming session over the second wireless link based at least in part on the determining. Additionally or alternatively, some examples may include processes, features, means, or instructions for establishing an ASP session between the source device and the sink device over the first wireless link, and transmitting a streaming session request message to the sink device over the first wireless link.

Some examples of the method, apparatuses, or non-transitory computer-readable medium described herein may further include processes, features, means, or instructions for transmitting, from the source device, the source device connection policy, and receiving, from the sink device, a sink device connection policy. Additionally or alternatively, some examples may include processes, features, means, or instructions for modifying, at the source device, the source device connection policy, and transmitting, from the source device, the modified source device connection policy to the sink device.

Some examples of the method, apparatuses, or non-transitory computer-readable medium described herein may further include processes, features, means, or instructions for establishing the streaming session over the first wireless link, modifying, at the source device, the source device connection policy, and switching the streaming session over the first wireless link to the streaming session over the second wireless link based at least in part on the modified source device connection policy. Additionally or alternatively, some examples may include processes, features, means, or instructions for performing a link quality test associated with the one or more attributes of the first wireless link to determine a link quality of the first wireless link prior to establishing the streaming session.

Some examples of the method, apparatuses, or non-transitory computer-readable medium described herein may further include processes, features, means, or instructions for receiving, from the sink device, one or more link quality metrics associated with the first wireless link. Additionally or alternatively, some examples may include processes, features, means, or instructions for performing a link quality test associated with the streaming session.

In some examples of the method, apparatuses, or non-transitory computer-readable medium described herein, the source device connection policy comprises one or more of an existing connection parameter, a concurrency support parameter, a multicast support parameter, a supported frequency band parameter, or a minimum link throughput parameter. Additionally or alternatively, some examples may include processes, features, means, or instructions for performing a service discovery protocol to identify one or more service advertisers that support the streaming protocol, wherein the one or more service advertisers include the sink device.

Some examples of the method, apparatuses, or non-transitory computer-readable medium described herein may further include processes, features, means, or instructions for comparing the one or more attributes of the first wireless link with the source device connection policy, identifying a preference of the source device connection policy corresponding to the identified one or more attributes of the first wireless link, and determining whether the identified one or more attributes of the first wireless link satisfies the preference of the source device connection policy.

Some examples of the method, apparatuses, or non-transitory computer-readable medium described herein may further include processes, features, means, or instructions for comparing the one or more attributes of the second wireless link with the source device connection policy, identifying a preference of the source device connection policy corresponding to the identified one or more attributes of the second wireless link, and determining whether the identified one or more attributes of the second wireless link satisfies the preference of the source device connection policy.

In some examples of the method, apparatuses, or non-transitory computer-readable medium described herein, the one or more attributes of the first wireless link or the second wireless link includes a supported frequency band, a link throughput, or a received signal strength indication (RSSI). The preference of the source device connection policy may include a predetermined threshold corresponding to the supported frequency band, the link throughput, or the RSSI.

Some examples of the method, apparatuses, or non-transitory computer-readable medium described herein may further include processes, features, means, or instructions for determining whether the supported frequency band, the link throughput, or the RSSI exceeds the predetermined threshold.

Some examples of the method, apparatuses, or non-transitory computer-readable medium described herein may further include processes, features, means, or instructions for receiving a request to establish the first streaming session from an application of the source device, wherein the request comprises a source device discovery policy, and determining the service discovery protocol to perform based at least in part on the source device discovery policy. Additionally or alternatively, in some examples the source device discovery policy comprises one or more of a supported discovery protocol parameter and a preferred discovery protocol parameter.

Some examples of the method, apparatuses, or non-transitory computer-readable medium described herein may further include processes, features, means, or instructions for performing the service discovery protocol comprises performing post association discovery using one or more of a multicast domain name system (mDNS) service discovery protocol or a simple service discovery protocol (SSDP) in a universal plug and play (UPnP) protocol, or a pre-association discovery using wireless peer-to-peer (P2P) discovery procedure. Additionally or alternatively, in some examples the first wireless link comprises an infrastructure link between the source device and the sink device through an access point of the WLAN.

In some examples of the method, apparatuses, or non-transitory computer-readable medium described herein, the first streaming session is over a second wireless connection between the source device and the sink device, wherein the second wireless connection comprises a wireless peer-to-peer connection between the source device and the sink device.

BRIEF DESCRIPTION OF THE DRAWINGS

Aspects of the disclosure are described in reference to the following figures:

FIG. 3C illustrates an example of an advertise service primitive in accordance with various aspects of the present disclosure;

DETAILED DESCRIPTION

Aspects of the disclosure are initially described in the context of a wireless communication system. Specific examples are then described for managing service discovery and topology for multimedia streaming over wireless local area network (WLAN) connections. These and other aspects of the disclosure are further illustrated by and described with reference to apparatus diagrams, system diagrams, and flowcharts that relate to managing service discovery and topology for multimedia streaming.

Systems, methods, and apparatuses for managing service discovery and topology for multimedia streaming over WLAN connections are described herein. Multimedia streaming service discovery and connection setup may be possible over both a peer-to-peer (P2P) connection or existing infrastructure connections, and requirements that may be imposed by a specific service may require a specific approach. The service discovery and topology management methods described herein may provide procedures for discovering available connection topologies, selecting a connection topology, and/or dynamically switching between connection topologies based on available resources or to otherwise satisfy the throughput, quality or latency requirements for a specific service. Approaches that may use infrastructure connections for multimedia streaming service discovery and policy for selection or switching of connection topology for various use cases or applications are considered below. These approaches may set discovery and connection policy based on the state of device resources or service requirements to facilitate use of a preferred discovery protocol by an application service platform (ASP). These approaches may use connection capability exchange to include connection policy set by a service to indicate a type of connection and associated parameters based on pre-connection link monitoring or measurements or based on monitoring of existing infrastructure connection. Criteria are described to select or switch connections based on service parameters or certain attributes of available connection types before starting a data session or during an ongoing data session. The below approaches may use one or more ASP coordination protocols to manage switching of connections dynamically based at least in part on the need of the service for a same service session. Furthermore, the approaches may provide multimedia streaming-specific service discovery information when performing post-association discovery over existing infrastructure connections.

Figure 1:
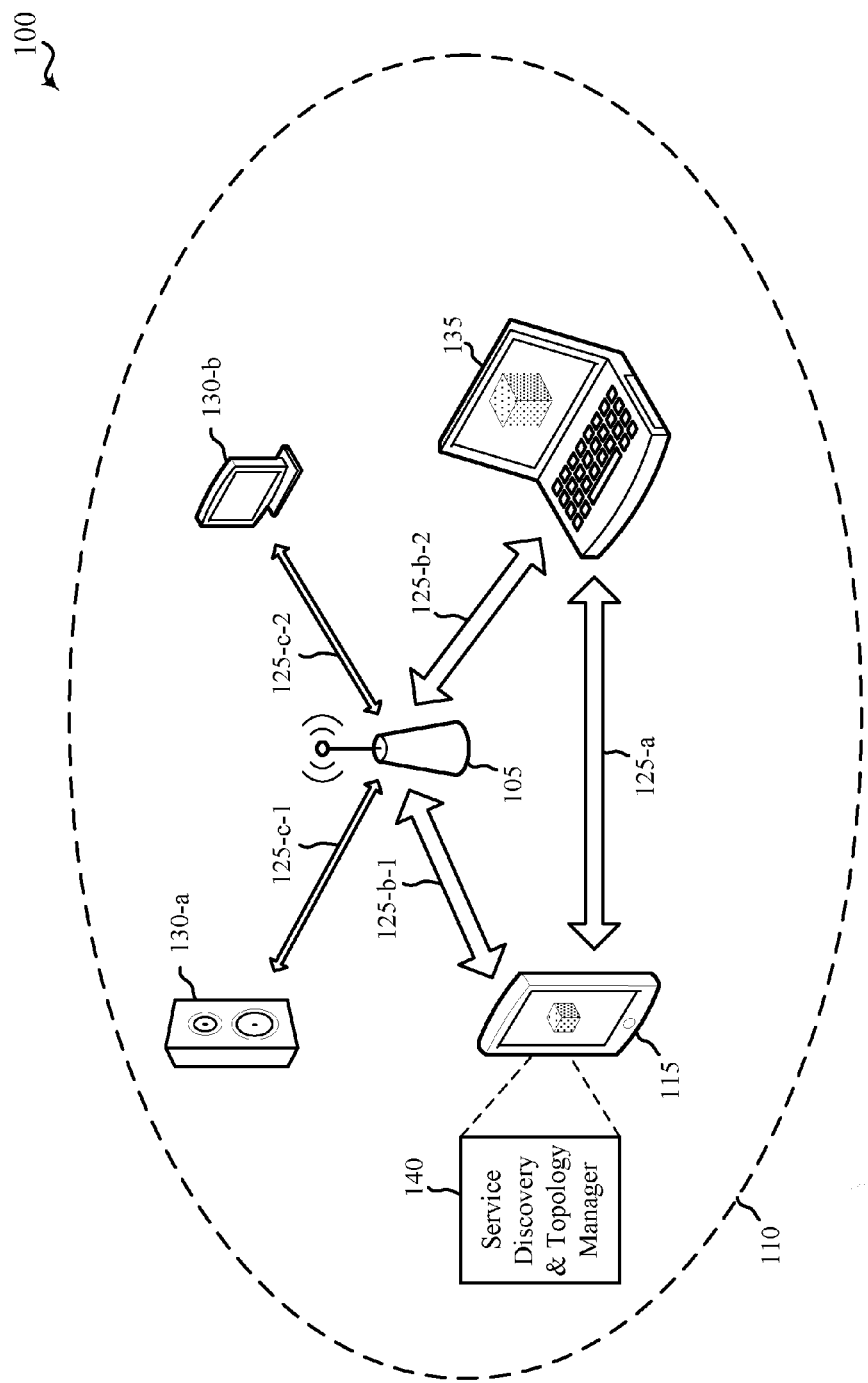
FIG. 1 shows a diagram of a system for display of content from one device onto the display of another device by video and/or audio content streaming in accordance with various aspects of the present disclosure.

FIG. 1 illustrates a WLAN 100 that includes a source device 115 and a sink device 135 and may include one or more access points (APs) 105. Examples of the source device 115 may include, but are not limited to, smartphones, cell phones, wireless headphones, wearable computing devices, smartwatches, tablets, personal digital assistants (PDAs), laptops, or any other device capable of communicating with a sink device 135 via a connection (e.g., wired, cellular wireless, Wi-Fi, Bluetooth, etc.). Examples of sink device 135 may include, but are not limited to, in-vehicle infotainment devices, TVs, computers, laptops, projectors, cameras, smartphones, wearable computing devices, or any other device capable of communicating with a source device 115 and rendering or displaying content received from the source device 115. The sink device 135 may be a combination of devices. For example, the sink device 135 may include a display device and a separate device for receiving, buffering, decoding, and processing content for display on the display device.

Source device 115 may be connected to sink device 135 via wireless link 125. Wireless link 125 is illustrated in FIG. 1 as a wireless link but may be a wired or wireless link in some examples. Communications between a source device 115 and a sink device 135 connected via a wireless peer-to-peer connection may be performed to remotely render content of the source device 115 at the sink device 135. WLAN remote display includes, but is not limited to the Wi-Fi Display specification, also known as Miracast® from Wi-Fi Alliance, Discovery and Launch (DIAL), Digital Living Network Alliance® (DLNA), Airplay, WirelessHD™, Wireless Home Digital Interface (WHDI), Wireless Display (Wi-Di) technology from Intel®, and Ultra-wideband (UWB) connections. While the following techniques are described using the wireless networking architecture illustrated in FIG. 1, the described techniques are applicable to any suitable wired or wireless communication technology.

In one example, the source device 115 is connected to the sink device 135 via a Wi-Fi Display connection. The Wi-Fi Display protocol, variations of which may be known as Miracast®, allows a portable device or computer to transmit media content (e.g., video, audio, images, etc.) to a compatible display wirelessly, and may enable delivery of compressed standard or high-definition or ultra-high-definition video over a wireless link 125. It also may allow users to echo the display from one device onto the display of another device. Wireless link 125 may be a direct, peer-to-peer wireless link (e.g., wireless link 125-a), or an indirect wireless link (e.g., wireless link 125-b) through a WLAN AP. Examples of direct wireless links include Wi-Fi Direct connections and connections established by using a Wi-Fi Tunneled Direct Link Setup (TDLS) link.

Wi-Fi Display may allow users to echo the display from one device onto the display of another device by video and/or audio content streaming. The wireless link 125 between the source device 115 and sink device 135 may be bi-directional. In one configuration, the connection between the source device 115 and a sink device 135 may also allow users to launch applications stored on the source device 115 via the sink device 135. For example, the sink device 135 may include various input controls (e.g., mouse, keyboard, knobs, keys, user interface buttons). These controls may be used at the sink device 135 to initialize and interact during the audio/video streaming from the source through the media applications stored on the source device 115. The connection between the source device 115 and sink device 135 may also allow a user to transfer text, files, and/or other data from the sink device to the source device.

Wireless device 130-a and wireless device 130-b may be connected to AP 105 with a wired or wireless link 125. Wireless devices 130, like sink device 135, may include, but are not limited to, in-vehicle infotainment devices, TVs, computers, laptops, projectors, cameras, smartphones, wearable computing devices, or any other device capable of communicating with a source device 115, and displaying content received from the source device 115. During discovery, as further described below, a source device 115 may search for wireless devices, including wireless devices 130 and sink device 135, with which to form a streaming session. Here, sink device 135 is the selected sink device, but one or more of wireless devices 130 may have been identified as a potential sink device, and rejected. Instead, they remain connected wirelessly to AP 105 while source device 115 establishes a streaming session with sink device 135.

Although not shown in FIG. 1, a source device 115 may be located in the intersection of more than one coverage area 110 and may associate with more than one AP 105. A single AP 105 and an associated set of stations (STAs), which may include source device 115, sink device 135, and/or wireless devices 130, may be referred to as a basic service set (BSS). An extended service set (ESS) is a set of connected BSSs. A distribution system (DS) (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. source device 115, sink device 135, and/or wireless devices 130 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, etc.

Service discovery and topology manager 140, as further described below, manages service discovery and topology for multimedia streaming over WLAN connections. For example, service discovery and topology manager 140 may manage the process of discovering and establishing a connection with one or more sink devices, for example sink device 135, with which the source device 115 may establish a streaming session over a wireless link. Such wireless link may be an infrastructure wireless link, including wireless link 125-b-1 and wireless link 125-b-2 through AP 105, or a peer-to-peer (P2P) wireless link, including wireless link 125-a, directly between source device 115 and sink device 135. Service discovery and topology manager 140 may also manage the connection for the streaming session between source device 115 and sink device 135, monitoring the wireless link between them, and switching the stream session between an infrastructure connection and a P2P connection according to various criteria, including observations about the wireless link and a connection policy of the source device.

P2P connections may be used to stream multimedia from a source device 115 to a sink device 135. To establish the P2P connection, a discovery protocol and a connection protocol may be performed over wireless link 125-a to connect them and allow for multimedia streaming between the devices. These protocols may specify device and service discovery over the P2P connection to identify categories for devices, including source, primary sink, secondary sink, or dual role (e.g., acting as both source and sink), and to identify optional discovery information (e.g., capabilities such as supported audio and/or video formats, etc.). An example of a common service discovery framework over P2P includes a display service that is part of Wi-Fi direct services (WFDS).

However, it may be desirable to allow for a source device 115 to discover a sink device 135, through their respective wireless connections with AP 105, wireless link 125-b-1 and wireless link 125-b-2. Other wireless devices connected to AP 105, including wireless device 130-a and wireless device 130-b, may be evaluated for connection during the discovery process. Each of the evaluated devices may deploy aspects of an ASP framework, the details of which are described further below. The ASP framework may be used to implement service and connection topology management techniques. Procedures to handle ASP service primitives for advertising or seeking multimedia streaming services through discovery, as well as options to select and switch connection topologies based on service requirements, may be performed by the service discovery and topology manager 140. The ASP framework may include several discovery protocols. Such discovery protocols may use the infrastructure connection, near-field communication (NFC), neighbor awareness networking (NAN), or Bluetooth low energy (BTLE), for example. A common service discovery and connection topology management may be used, but with specific policies for using the ASP framework to invoke a desired discovery protocol and select a connection topology of a specific multimedia streaming service.

Even if a sink device or source device is discoverable using a P2P link and an infrastructure link, concurrent connections of multiple multimedia streaming services may not be possible. Connection policies for the source device and for the sink device may be desirable to ensure that various use cases, based on P2P and infrastructure links, a set of service discovery policies for various possible scenarios may be specified. After discovery, whether through a P2P or an infrastructure connection, a further selection of a correct connection topology (e.g., P2P or infrastructure) for a multimedia streaming session, or switching between multimedia streaming via the P2P or infrastructure links, may be performed based on throughput tests or a monitored link quality or latency, and/or feedback of link quality metrics for the streaming session. The source device may switch the streaming session between the first wireless link and the second wireless link based at least in part on this information. The source device connection policy may also be modified, and the streaming session may be switched based at least in part on the modified connection policy.

Figure 2A:
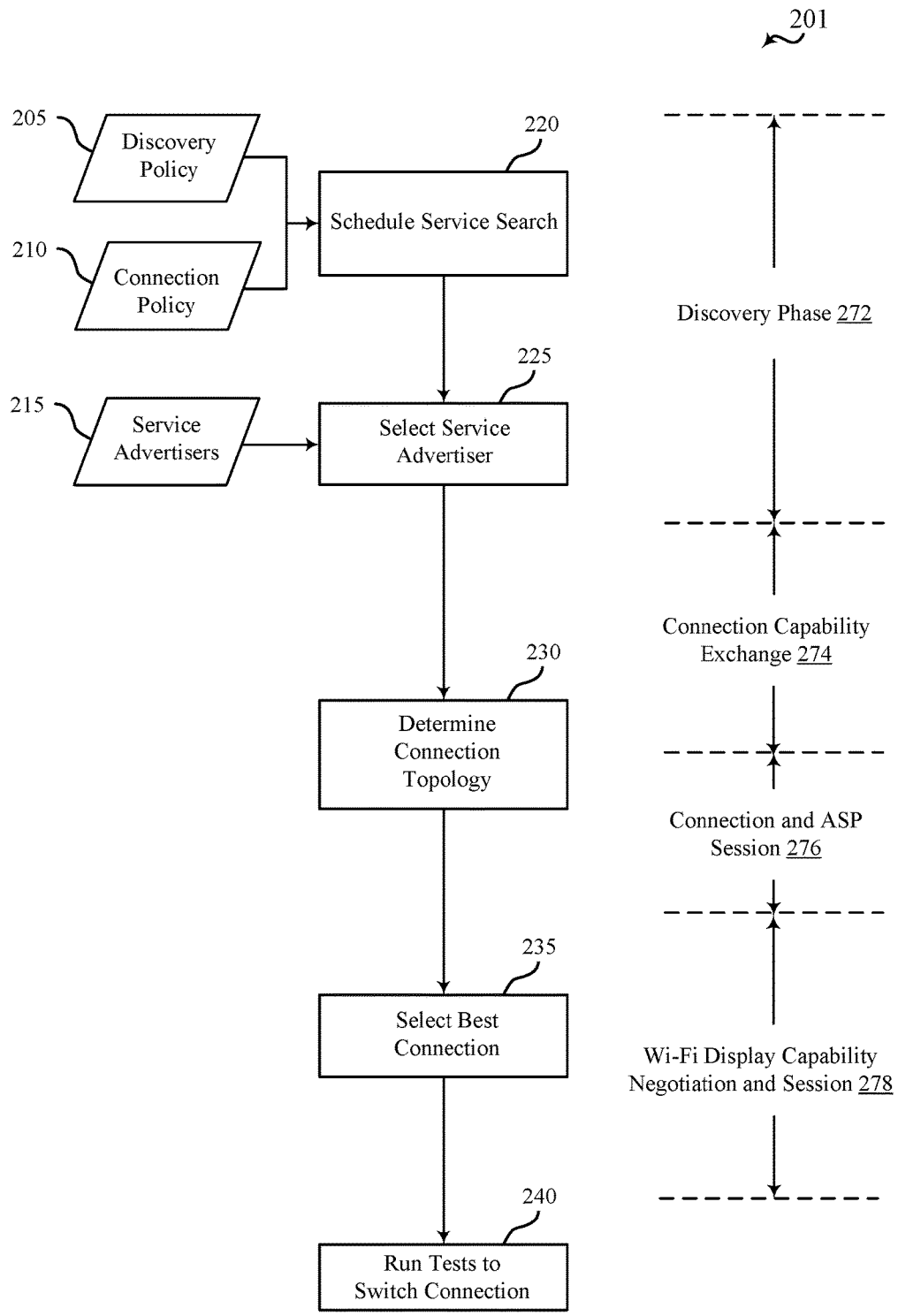
FIG. 2A illustrates an example process for managing service discovery and topology for multimedia streaming over an infrastructure wireless connection in a wireless local area network (WLAN) in accordance with various aspects of the present disclosure.

FIG. 2A illustrates an example process 201 for managing service discovery and topology for multimedia streaming over an infrastructure wireless connection in a WLAN in accordance with various aspects of the present disclosure. In the example process 201, the streaming session is discovered and established in an infrastructure connection mode, where a source device may be connected to a sink device through an AP, for example an AP 105. Several phases for establishment of a service session are illustrated as a function of time: a discovery phase 272, a connection capability exchange phase 274, a connection and ASP session phase 276, and a Wi-Fi Display capability negotiation and session phase 278.

Figure 2B:
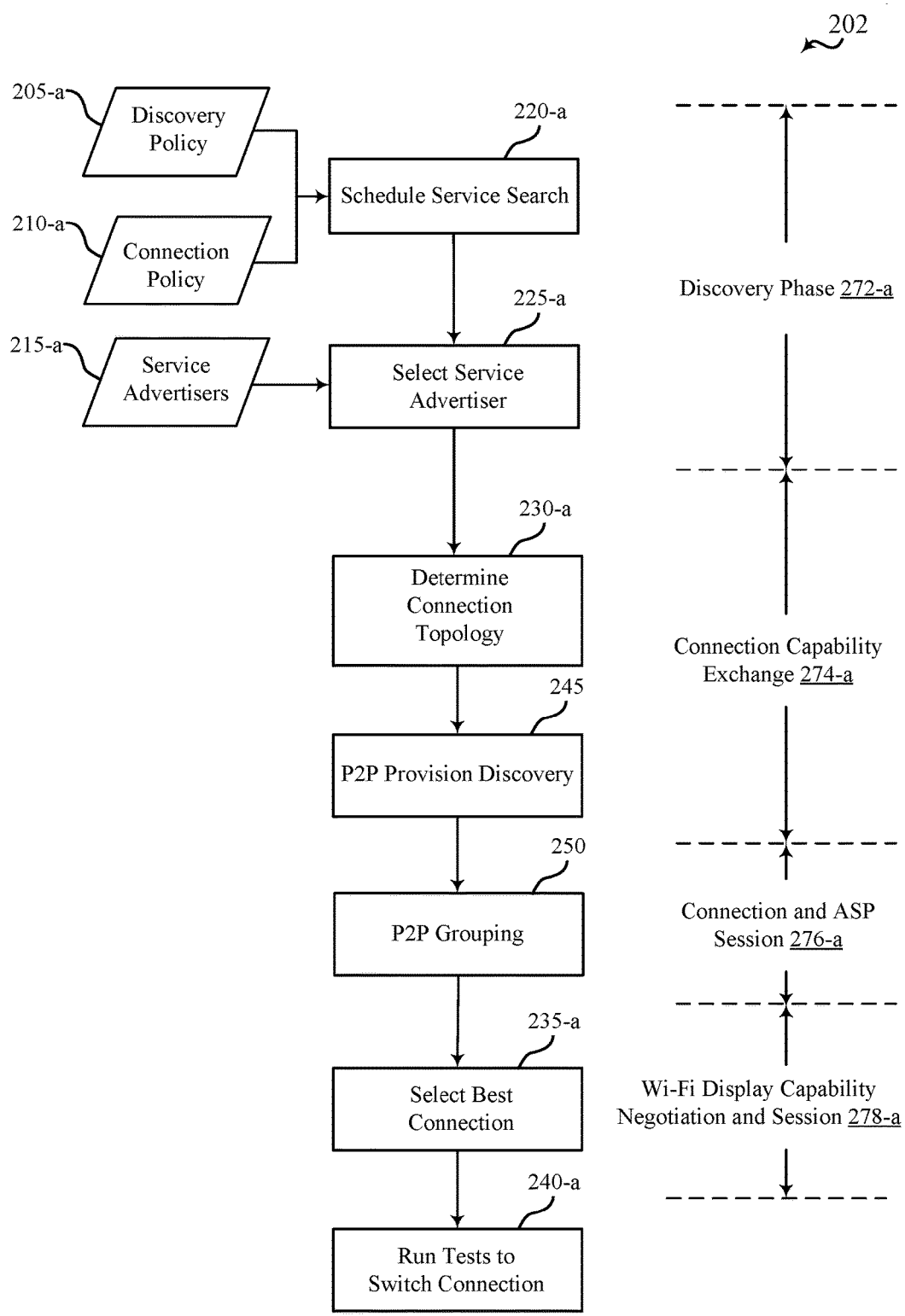
FIG. 2B illustrates an example process for managing service discovery and topology for multimedia streaming over a Wi-Fi P2P wireless connection in accordance with various aspects of the present disclosure.

FIG. 2B illustrates an example process 202 for managing service discovery and topology for multimedia streaming over a Wi-Fi P2P wireless connection in accordance with various aspects of the present disclosure. In the example process 202, the streaming session is discovered and established in a P2P connection mode, where a source device may be connected directly to a sink device, and not through an AP such as AP 105. Several phases for establishment of a service session are illustrated as a function of time: a discovery phase 272-a, a connection capability exchange phase 274-a, a connection and ASP session phase 276-a, and a Wi-Fi Display capability negotiation and session phase 278-a, which may correspond to the discovery phase 272, connection capability exchange phase 274, connection and ASP session phase 276, and Wi-Fi Display capability negotiation and session phase 278 illustrated with reference to FIG. 2A, respectively.

Referring now to both FIGS. 2A and 2B, a source device 115 or a sink device 135 may assume the role of a service seeker to find other devices capable of providing a specific service to the service seeker. An application, running on the source device 115 or sink device 135 may act as a service seeker, and may request a multimedia streaming session. This request may trigger seeking the service for a multimedia streaming session. A source device 115 or a sink device 135 may also assume the role of a service advertiser that provides information concerning its service information.

The service seeker may have an application, a display service, and an ASP. As mentioned above, the application may trigger the display service to seek the service for a multimedia streaming session. The display service (or display service stack) may then issue, to the ASP, a seek service primitive (e.g., as discussed with reference to FIGS. 3A-3B below). When more than one service is sought, e.g., if a source device is seeking multiple sink devices, such as a primary sink service and a secondary sink service, the seek service primitive may be called multiple times, e.g., called once for each sink device of the multiple sink devices. The ASP may then receive the seek service request from the display service. Upon receiving the seek service request, the ASP may schedule the order of discovery if more than one discovery search is requested, and set the priority of such discovery requests.

Referring to FIG. 2A, during the discovery phase 272 in an infrastructure mode, the ASP of a service seeker may, at block 220, use a device discovery policy 205 and a device connection policy 210 to schedule a search (e.g., a discovery query) for service advertisers with one or more of the protocols indicated in the device discovery policy 205 or the device connection policy 210. The details of an exemplary discovery policy 205 are described in more detail with reference to FIGS. 3A below, and the details of an exemplary connection policy 210 are described in more detail with reference to FIGS. 3A-3B.

Referring to FIG. 2B, during the discovery phase 272-a in a P2P connection mode, the ASP of a service seeker may, at block 220-a, schedule a search to search for service advertisers with one or more protocols indicated in the device discovery policy 205-a or the device connection policy 210-a. The search at block 220-a may include a probe request/response procedure and/or a service discovery procedure. The search may be performed in a particular order, or in parallel, subject to the preference of the service seeker.

Referring to both FIGS. 2A and 2 B, the search advertisers 215 may be returned from multiple searches for different discovery protocols, and may include the same service advertiser in multiple search results. The ASP of the service seeker may select, at block 225, 225-a, one of the returned search advertisers from the searched service advertisers 215. If a service advertiser discovered in the discovery search is accepted for connection, the ASP may then abandon the discovery search over remaining discovery protocols, and proceed with connection setup for an ASP session with the selected service advertiser.

Once a service advertiser has been selected based on the discovery policy 205 and/or connection policy 210, the ASP may determine how connection capability exchange (e.g., connection capability exchange phase 274, 274-a) should be executed for the device once the device and service discovery phase 272, 272-a is complete. The determination may be based at least in part on the reference information included in the discovery policy 205 and/or the connection policy 210 for the service seeker, e.g., based on the preferred/supported frequency spectrum bands over which the service seeker would like to communicate, the current infrastructure connection status, etc. In addition, if the connection policy 210 contains criteria used to select a connection topology, e.g., a minimum required link throughput, minimum link RSSI, preferred connection mode, etc., the ASP may then attempt to setup the connection with the preferred connection mode according to the connection policy 210.

Figure 3A:
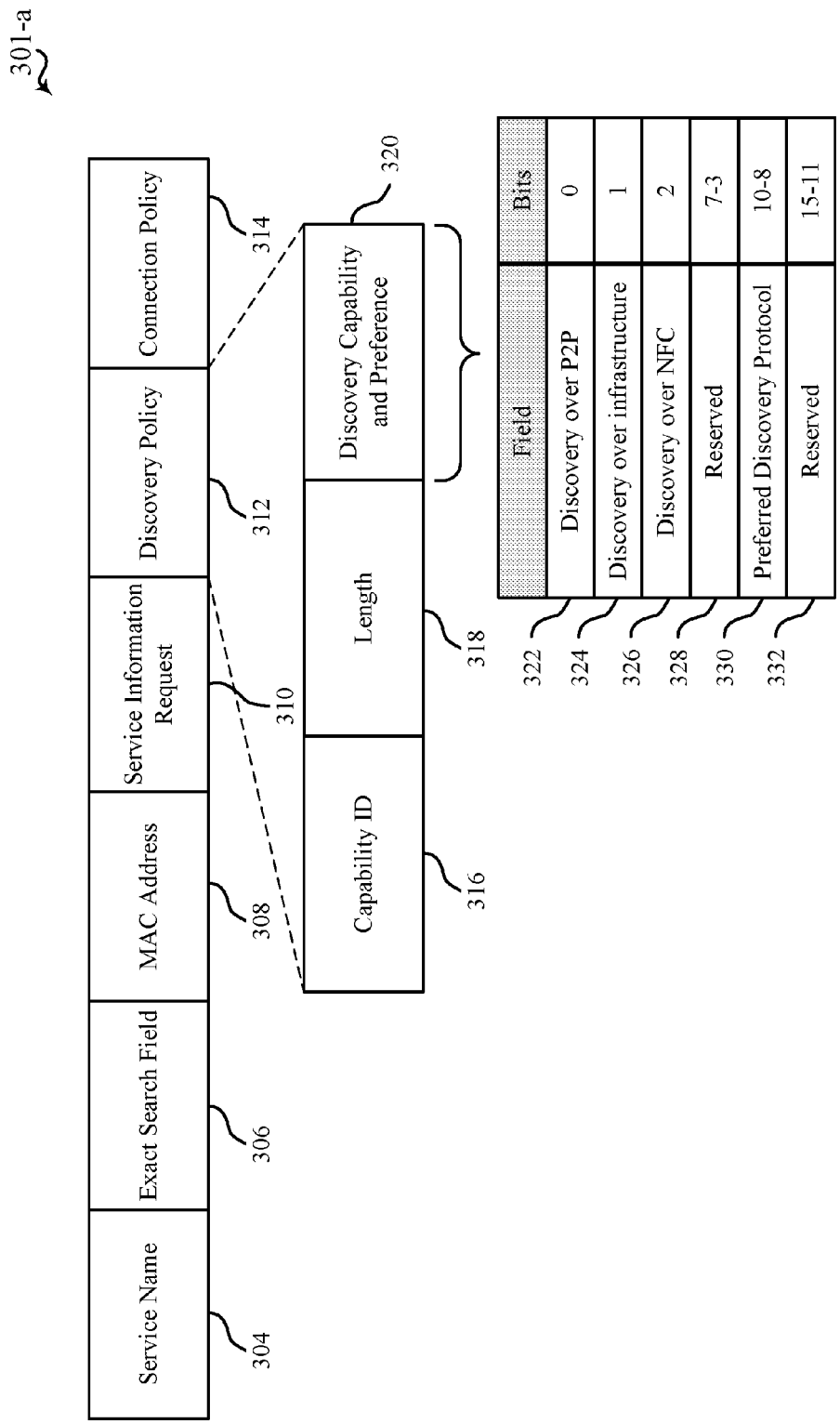
FIGS. 3A-3B illustrate examples of seek service primitives in accordance with various aspects of the present disclosure.
Figure 3B:
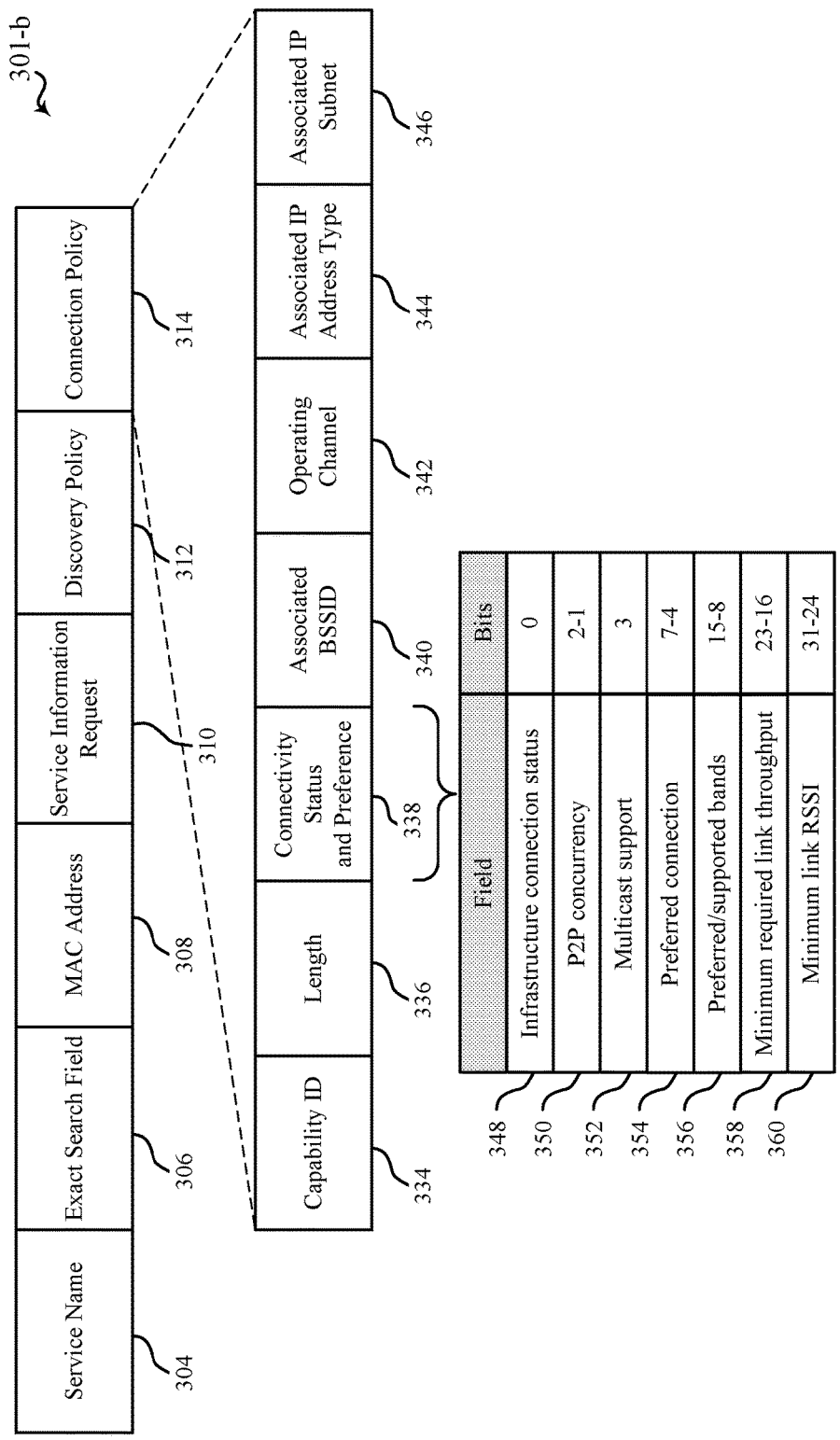

A service seeker device may adhere to several rules when specifying the discovery policy information and connection policy information further described herein with respect to FIGS. 3A-3B and Tables 1-4 to include in a seek service request. If the service seeker is already associated to an infrastructure network and does not support P2P concurrency, it indicates a request for discovery over the infrastructure network. If the search over the infrastructure network is not successful, the service seeker may then disassociate from the infrastructure network, if the user prefers, and restart the seek service process according to a P2P discovery protocol, or any other discovery protocol that the service seeker may support. The service seeker may provide a preference on the order of discovery protocols when the service seeker indicates a request for more than one discovery protocol. The seeker may also indicate the band and channel information it may be able to support, including whether the band is 2.4 GHz, 5 GHz, or 60 GHz, existing connection, and channel info. These frequency bands only describe one example and can apply to other frequency bands.

The above-described aspects of discovery phase 272, 272-a have been discussed with reference to the service seeker, which may be a source device 115, but may also be a sink device 135. The service advertiser, which may be a sink device 135, but may also be a source device 115, can assume the role of service advertiser to advertise that it may support a multimedia streaming session as a service through its ASP. The advertisement of the service may be triggered by an application of the service advertiser supporting multimedia streaming, for example a sink device 135. The display service (or display service stack) of the service advertiser issues an advertise service primitive to the ASP (see FIG. 3C).

Referring to FIG. 2A, after a successful device and service discovery phase 272, connection capability exchange may be performed through the ASP platform to establish a service network connection. During the connection capability exchange phase 274 in an infrastructure mode, the ASP of the service seeker may, at block 230, may include some or all of the information received from service advertiser(s) (e.g., service advertises 215) during the discovery phases 272 to determine a connection topology. Based on the possibility of using a P2P network connection, an infrastructure network connection, or both to perform discovery, the ASP performs connection capability exchange after receiving a connect sessions method (e.g., ConnectSession( )) from the service seeker.

Information from the connection policy 210 may be included in the connect sessions method from the service seeker. Such information may include a service MAC address, an advertisement identifier, session information, a network role, network configuration information, and the connection policy.

If a connection already exists between the source device 115 and the sink device 135 through the AP 105 (e.g., an infrastructure connection), the existing L3 connection can be used to exchange connection capability and preferences between the service seeker and service advertiser, e.g., by including the connection policy information in a dedicated data frame used between peer ASPs, e.g., an ASP of the service seeker and the ASP of a service advertiser, for this purpose. In such cases, the existing L3 connection may be used instead of initiating a separate connection and ASP session phase to determine a feasible connection.

Referring to FIG. 2B, during the connection capability exchange phase 274-a, if an infrastructure or P2P connection does not already exist, a P2P provision discovery request/response procedure at block 245 may be started between the service seeker and service advertiser to determine which P2P connection is feasible. Then, during a connection and ASP session phase 276-a, a service seeker and/or service advertiser may participate in P2P grouping at block 250, where a P2P group may be formed or an existing P2P group joined. P2P group formation may include starting negotiation or starting an autonomous group owner (GO) from the device having GO role as its preferred connection. The connection policy information may be included in the provision discovery request/response as a new attribute.

While in a pre-connection state, a connection topology may be determined according to several criteria. In a P2P discovery phase 272-a, the peer source and sink devices may determine the RSSI and band information for the channels used for P2P frame exchanges to set a connection policy. In a discovery phase 272 for an existing infrastructure network, source and sink devices may monitor the link quality based on PHY/MAC statistics to set the parameters in the connection policy.

By exchanging the connection capability information based on the possible connection options (P2P only, infrastructure only, or both P2P and infrastructure) and indicating for multicast support, peer ASP entities (source device ASP and sink device ASP) can determine several items. First, which connection, between a P2P connection and an infrastructure connection, may be best for an initial connection and an ASP session. Second, what are the candidate connection topologies if there is a need to switch the connection over which ASP sessions are running (connection types, band and channels, possible data rates, etc.). Such switch may be between a P2P connection or an infrastructure connection. Third, what is the supported link throughput, e.g., modulation and coding scheme (MCS) at the existing infrastructure connection for each available connections. If, after the connection capability exchange, more than one connection type is possible based on connection capability exchange, source and/or sink devices may activate implementation-specific tests or start monitoring connection links to facilitate selection of the best link for a data session. Such implementation-specific test may include, e.g., throughput tests, link statistics on packet error, etc.

Referring to both FIGS. 2A and 2B, during the Wi-Fi Display (WFD) capability negotiation and session phase 278, 278-a, after the ASP session is established between devices over a new or existing connection, an ASP coordination protocol may be started to exchange ASP session information. Based on various tests and measurements, or feedback mechanisms to receive link quality indication or metrics from a peer device that can be used between the connected devices, the display service between peer source and sink devices negotiate the connection policy or switch connection based on the connection policy information set by the display service. Several criteria may be used to determine a preferred connection topology or to evaluate or determine when to switch from one connection to another connection.

At block 235, 235-a, prior to beginning to stream multimedia content using the multimedia streaming session, various tests may be deployed to determine a quality of a connection used for a data session. For example, once an L3 connection is established for a real-time streaming protocol (RTSP), the device deploying the test, e.g., the source device, can activate the test over multiple possible connections to determine which may be preferred to establish a multimedia streaming session. Such tests may include, for example, a throughput test or a link quality measurement. In addition, feedback of link quality metrics for available connections may be exchanged by RTSP messages (e.g., RTSP negotiation and Wi-Fi direct session procedure in an infrastructure mode or RTSP negotiation procedure in a P2P mode) or low layer methods, e.g., 802.11k measurements. The display services in the source device or the sink device may provide expected link throughput, use of multicast or unicast transport, power save options, and available connections to the ASP so that the ASP may switch the connection if required.

Referring again to FIGS. 2A and 2B, at block 240, 240-a, after beginning to stream multimedia content using the multimedia streaming session, other or additional criteria may be used to determine a preferred connection topology or evaluate or determine when to switch from one connection to another connection. These criteria may each be evaluated alone or in combination to make this determination.

First, the supported link throughput (e.g., MCS) may be considered. The link throughput may be considered for the currently existing connection, as well as considered for alternate connections, based at least in part on tests and/or measurements that compare the required application layer throughput, for example a video data rate or an audio data rate.

Second, the signal strength for an infrastructure connection may be compared against a P2P connection. The signal strength measurements may be a received signal strength indication (RSSI), a received channel power indicator (RCPI), or a received signal to noise indicator (RSNI). In some example the signal strength for the infrastructure connection may be compared against the a minimum required RSSI in a connection policy, and the signal strength for the P2P connection may be compared against the minimum required RSSI in the connection policy.

A third criteria is an out of range or dropped connection. For example an existing connection may not be sufficient as indicated by missing RTSP keep alive message timeouts. However, an alternate connection may still be within range.

A fourth criteria to determine a preferred connection topology or evaluate or determine when to switch from one connection to another connection is an evaluation of latency statistics. Latency statistics may be compared against required latency values such as latency critical real-time (e.g., e2e 40 ms for audio, 100 ms for video, or non-real time traffic (e.g., video playback)). The latency statistics can be provided from the link layer to the display service. For example, timestamps of the real-time transport protocol (RTP) data packets or monitoring the presentation time stamp (PTS) and/or program clock reference (PCR) of the moving pictures expert group-2 transport stream (MPEG2-TS) may provide real-time latency estimates.

A fifth criteria may be an evaluation of whether a required transmission method (e.g., multicast or unicast transmission) is supported.

A sixth criteria may be to evaluate link statistics feedback or an indication of link quality. An example is upper layer link statistics feedback, e.g., RTCP sender report (SR) or RTCP receiver report (RR) or packet loss statistics. Another example is layer 2 (L2) link quality indication. The L2 link quality indication may be based on feedback from another device or its own WLAN layer statistics, e.g., 802.11k counters.

A seventh criteria includes evaluation of a power save policy of the source device or the sink device. Certain power saving features provide better interoperability with infrastructure connections. So, when using certain power save features, e.g., unscheduled automatic power save delivery (U-APSD) or other power save, an infrastructure connection may be used. However, some delays may result when in power save mode.

Having considered and evaluated the above criteria for either of a pre-connection evaluation (e.g., to select a service advertiser at block 225, 225-a) or a post-connection evaluation (e.g., to switch a connection as described with reference to block 240, 240-a), the ASP can determine a preferred connection topology or when to switch from one connection type to another based on a connection policy set by the service seeker and a service advertiser. The service seeker or service advertiser may send a request to the ASP to switch connections if the service determines that some criteria are supported by the existing connection. A request to switch connections may also be triggered by a user intervention seeking to switch connections. The connect sessions method is invoked from the service seeker if the connection is to be switched from an infrastructure connection to a P2P connection. Post-association ASP primitives may be invoked if the connection is to be switched from an infrastructure connection to a P2P connection. While the connection type may be switched from one type to another type, the streaming session on the infrastructure connection, e.g., the RTSP session, or the streaming session on the P2P connection, e.g., a multimedia streaming session, does not need to be torn down in order to make the switch to the other connection type.

In addition to switching a connection from an infrastructure connection to a P2P connection, the connect sessions method may be expanded to initiate a connection switch to include one or more infrastructure connections if required by the service seeker. As discussed further above, the connect sessions method may include a connection policy. The network role parameter of the connection policy may be expanded to include the connectivity status and preference bitmap (see, e.g., Table 4), or to indicate a preferred connection mode, e.g., an infrastructure connection or a P2P connection.

When an ASP coordination protocol is running between a source device and a sink device, the display service may send a request session message with details of the connection parameters to switch the session to an alternate connection type. A new message, e.g., a request connection switch message, may be used for the same purpose of switching the existing connection to an alternate connection type. The same session identifier (ID) may be used so that the multimedia streaming session may continue after switching to the new connection.

The request session message may contain several fields, including a session MAC field, a session ID field, an advertisement ID field, and a session information field. The session information field of the request session message may include details concerning the preferred connection for the service session.

Certain service seekers and advertisers discussed above may prefer to only establish a multimedia streaming session over a particular type of connection. Such preference may be indicated in the connection policy, and specifically the connection for the service seeker and/or service advertiser. For example, a sink device that may be already associated with an AP, and in an active session with one or more other devices, may set its availability to connect only in the same channel as the current active session. This sink device may be connected to a device server (DS) via an Ethernet connection. Furthermore, data throughput and latency in an infrastructure connection set up for a multimedia streaming session may depend on the type of AP and channel utilization.

When evaluating the quality of a link that has been set up for a multimedia streaming session, even when discovery of a source device and a sink device over an infrastructure connection has been successful, in some scenarios, a multimedia streaming session over P2P may be preferred. In first example, the link throughput via the infrastructure connection may not be sufficient to meet the bit rate for the streaming session. In a second example, a latency-critical application may prefer a one-hop P2P link to a two or more-hop infrastructure link. Finally, in some examples, the congestion at the infrastructure connection may be high, including at the AP. Where a P2P connection in another channel is supported by both the source device and the sink device, the multimedia streaming session may be switched off-channel to the P2P connection concurrently having an established infrastructure connection, or the multimedia streaming session dissociated from the infrastructure network connection to establish the P2P connection.

In some scenarios, it may be preferred to support the multimedia streaming session over the infrastructure connection, rather than over a P2P connection. Such situations may include where both a sink device and a source device are already associated to an AP, and do not support concurrent P2P and infrastructure connections. The sink device and the source device may also be too far away from each other for a P2P connection, but each still close enough to the AP 105 to support an infrastructure connection with the AP. Finally, a user may simply want to restrict multimedia streaming sessions to the infrastructure network to reduce connection setup times or alleviate other issues related to starting a P2P connection.

Referring to FIG. 3A, an example of a seek service primitive 301-*a* is illustrated in accordance with various aspects of the present disclosure. The display service of a service seeker may issue the seek service primitive 301-*a* to the ASP of the service seeker to facilitate a service discovery process. The seek service primitive 301-*a* may have include a service name field 304, an exact search field 306, a MAC address field 308, a service information request field 310, a discovery policy field 312, and a connection policy field 314.

The service name field 304 specifies which specific service to be searched for in a service discovery query. Such service query may be performed by using, for example, a multicast domain name system (mDNS) service discovery protocol (e.g., Apple® Bonjour®), a simple service discovery protocol (SSDP) in a universal plug and play (UPnP) protocol, or another layer 3 (L3) discovery procedure, etc.

The exact search field 306 may be set to TRUE to require an exact search. The MAC address field 308 contains the MAC address of the service seeker. The service information request field 310 contains information regarding the nature of the service request.

The discovery policy field 312 indicates the discovery protocols supported by the display service, and preferences and/or priorities for discovery. In some examples, the discovery policy field 312 may include discovery policy information, including a capability ID field 316, a length field 318, and a discovery capability and preference field 320. The capability ID field 316 identifies the type of WFD capability of the service seeker and may have a size of 1 octet. The length field 318 indicates the length of the discovery policy and may have a size of 2 octets. The discovery capability and preference field 320 specifies the discovery protocols supported and preference, if any, and may have a length of 2 octets. In some instances, the preference setting may be applicable for the service seeker, but not the service advertiser, or vice versa. It may be understood that the field sizes provided for the discovery policy field 312 and Table 1 below are examples, and that the sizes of the fields may be increased or decreased, or be reordered, in other examples. In some examples, one or more fields may be omitted, or additional fields added.

Table 1 and Table 2 below show an example of discovery policy information that may be contained in the discovery policy field 312.

TABLE 1

Discovery Policy Information

| Field | Size (Octets) | Description |
| --- | --- | --- |
| Capability ID | 1 | Identifies the type of WFD capability |
| Length | 2 | Length is variable and indicates the length of the discovery policy |
| Discovery Capability and Preference | 2 | Specifies the discovery protocols supported and preference if any (preference setting is applicable only for the service seeker, the service advertiser shall set to "don't care") Refer to Table 2 below for an exemplary Discovery Capability and Preference Field bitmap |

The discovery capability and preference field 320 may be expressed as a bitmap as shown in FIG. 3A and in further detail in Table 2 below. Certain bits of the bitmap may indicate whether discovery over a P2P connection, over an infrastructure connection, or over an near field communication (NFC) connection is or is not supported. Certain other bits of the bitmap may indicate a preferred discovery protocol, including a preference for discovery over P2P, infrastructure, or NFC connections. For example, the discovery over P2P field 322, the discovery over infrastructure field 324, and the discovery over NFC field 326 may indicate with one bit each whether discovery over P2P, infrastructure, or NFC is supported. The reserved field 328 may include five bits that are reserved for additional information. The preferred discovery protocol field 330 may indicate with three bits that a P2P, infrastructure, or NFC connection is preferred, or that there is no connection preference. The reserved field 332 may include five bits that are reserved for additional information. It may be understood that the field sizes and bit values provided for the discovery capability and preference field 320 and Table 2 below are examples, and that the field sizes and bit values may be increased or decreased, or be reordered, in other examples. In addition, for the exemplary bitmap interpretation provided in Table 2 below, other combinations of bits may be used to indicate different options for each bit field. In some examples, one or more fields may be omitted, or additional fields added.

Table 2 shows further detail of the discovery capability and preference field 320, at the level of a bitmap.

TABLE 2

Discovery Capability and Preference Bitmap

| Bits | Name | Interpretation |
|---|---|---|
| 0 | Discovery over P2P | 0b0: not supported<br>0b1: supported |
| 1 | Discovery over infrastructure | 0b0: not supported<br>0b1: supported |
| 2 | Discovery over NFC | 0b0: not supported<br>0b1: supported |
| 7-3 | Reserved | |
| 10-8 | Preferred Discovery Protocol | 0b000: don't care (no preference)<br>0b001: P2P preferred<br>0b010: Infrastructure preferred<br>0b011: NFC preferred<br>0b100-0b111: Reserved |
| 15-11 | Reserved | |

The display service of either or both of the source device 115 or the sink device 135 may set a discovery protocol to be supported by all source and sink devices. The preferred discovery protocol shown in Table 2 for the discovery policy may be based at least in part on any discovery protocols that the display service requires for all devices, e.g., a P2P discovery protocol. The preferred discovery protocol for the discovery policy may be further based at least in part on the capability or resource status of the source and/or sink device at a given time. For example, a device with an NFC interface enabled may prefer NFC discovery. In another example, a device connected to the infrastructure network may prefer to perform a discovery protocol over the infrastructure network.

Referring to FIG. 3B, an example of a seek service primitive 301-b is illustrated in accordance with various aspects of the present disclosure. Seek service primitive 301-b may include aspects of the seek service primitive 301-a described with reference to FIG. 3A and illustrated to show additional details of the connection policy field 314. The connection policy field 314 indicates the connection preferences and/or priorities for various topologies. For example, the connection policy field 314 may include a capability ID field 334 that identifies the type of WFD capability of the service seeker, a length field 336 that indicates the length of the connection policy, and connection status and preference field 338 that specifies the connection status and preference, if any, for various connection modes. The associated BSS identifier (BSSID) field 340 provides the address of the infrastructure AP 105 to which the device (here, the service seeker) is associated when the device is associated to the infrastructure network. In addition, the operating channel field 342 provides the operating channel of the BSS when the device is associated to the infrastructure network. The associated internet protocol (IP) address type field 344 provides the IP address version when the device is associated to infrastructure network. Finally, the associated IP subnet field 346 provides the indicated network prefix information when the device is associated to the infrastructure network.

Table 3 below shows an example of connection policy information that may be contained in the connection policy field 314. It may be understood that the field sizes provided for the connection policy field 314 and Table 3 below are examples, and that the sizes of the fields may be increased or decreased, or be reordered, in other examples. In some examples, one or more fields may be omitted, or additional fields added.

TABLE 3

Connection Policy Information

| Field | Size (Octets) | Description |
|---|---|---|
| Capability ID | 1 | Identifies the type of WFD capability |
| Length | 2 | Length is variable and indicates the length of the connection policy |
| Connectivity Status and Preference | 4 | Specifies the connection status and preference for connection mode<br>Refer to Table 4 below for an exemplary Connectivity Status and Preference bitmap |
| Associated BSSID | 6 | When device is associated to infrastructure network, provides the Address of the infrastructure AP to which the Device is associated |
| Operating Channel | 5 | When device is associated to infrastructure network, provides the operating channel of the BSS: first 3 octets include Country String set to the value contained in the dot11Country String attribute specifying the country code in which the Operating Class and Channel Number fields are valid<br>Next octet include the operating class for the BSS<br>The last octet include the operating channel number for the BSS |
| Associated IP Address Type | 1 | When device is associated to infrastructure network, provides the IP address version:<br>0 when IP address is not provided (L3 connection not established)<br>1 for IPv4 address<br>2 for IPv6 address<br>3-255 are reserved and should be ignored |
| Associated IP Subnet | 5 or 17 | When device is associated to infrastructure network, provides the value:<br>4 octet IPv4 network prefix address or 16 octets for IPv6 address as set by "Associated IP Address Type" field<br>1 octet for number of bits in prefix<br>When "Associated IP Address Type" field is set to 0 or 3-255, this field is not present |

The connectivity status and preference field 338 may be expressed as a bitmap as shown in FIG. 3B and in more detail in Table 4 below. The infrastructure connection status field 348 may indicate with one bit the infrastructure connection status e.g., whether there exists an infrastructure network connection. The P2P concurrency field 350 may indicate with two bits whether various concurrency modes between an infrastructure connection and a P2P connection are supported. The multicast support field 352 may indicate with one bit whether multicast is supported for the device. The preferred connection field 354 may indicate with four bits whether infrastructure or P2P connections are preferred, and conditions for preferring one over the other. The preferred/supported bands field 356 may indicate with eight bits the preferred frequency over which the service seeker would like to communicate, including 2.4 GHz, 5 GHz, and 60 GHz. These frequency bands only describe one example and can apply to other frequency bands. The minimum required link throughput field 358 may indicate with eight bits the minimum WLAN link throughput for the service in units of 1 Mbps. The minimum link received signal strength indication (RSSI) field 360 may indicate with eight bits a minimum RSSI (in dBm) for the connection. A valid range for the minimum link RSSI may be from −100 dBm to 40 dBm, in increments of 0.5 dB, where −100 dBm has a value of "0", etc. This range of minimum link RSSI only describes one example and other ranges and increments of RSSI may be used.

Table 4 shows further detail of the connectivity status and preference field 338, at the level of a bitmap. It may be understood that the field sizes and bit values provided for the connectivity status and preference field 338 and Table 4 below are examples, and that the field sizes and bit values may be increased or decreased, or be reordered, in other examples. Also, for the exemplary bitmap interpretation provided in Table 4 below other combinations of bits may be used to indicate different options for each bit field. In some examples, one or more fields may be omitted, or additional fields added.

TABLE 4

Connectivity Status and Preference Bitmap

| Bits | Name | Interpretation | |
|---|---|---|---|
| 0 | Infrastructure connection status | 0b0: not connected to infrastructure network<br>0b1: connected to an infrastructure network | |
| 2-1 | P2P concurrency | 0b00: concurrent P2P and Infrastructure connection not supported<br>0b01: concurrent P2P supported in same channel of infrastructure<br>0b10: concurrent P2P supported in any channel as indicated by Preferred/supported bands<br>0b11: Reserved | |
| 3 | Multicast support | 0b0: not supported<br>0b1: supported | |
| 7-4 | Preferred connection | 0b0000: don't care (no preference)<br>0b0001: P2P preferred, can negotiate GO or Client role<br>0b0010: P2P preferred as GO role only<br>0b0011: only capable to use the existing Infrastructure connection (to be set only if b0 is set as 1, and the BSSID and operating channel information provided)<br>0b0100: Infrastructure preferred (to be set only if b0 is set as 1, but flexible to use P2P or join other infrastructure network)<br>0b0101-0b1111: Reserved | |
| 15-8 | Preferred/supported bands | b8 | 0b0: 2.4 GHz band not preferred or not supported<br>0b1: 2.4 GHz band supported |
| | | b9 | 0b0: 5 GHz band not preferred or not supported<br>0b1: 5 GHz band supported |
| | | b10 | 0b0: 60 GHz band not preferred or not supported<br>0b1: 60 GHz band supported |
| | | b11-b15 | Reserved |
| 23-16 | Minimum required link throughput | In units of 1 Mbps, to indicate the minimum Wi-Fi link throughput for the service<br>If set to 0, service does not have this value available, or not used. | |
| 31-24 | Minimum link RSSI | Minimum RSSI in dBm for the connection (valid range -100 to 40 dBm) 0 for < -100 dBm,<br>1: -99.5 dBm, and increments of 0.5 dB<br>If set to 255, this value is not used. | |

Referring to FIG. 3C an example of an advertise service primitive 302 is illustrated in accordance with various aspects of the present disclosure. The display service of a service advertiser may issue the advertise service primitive 302 to the ASP of the service advertiser to facilitate the advertisement of services. The advertise service primitive 302 may include several fields, including a service name field 364, an auto accept field 366, a service information field 368, a service status field 370, a network role field 372, network configuration field 374, a deferred session response field 376, a discovery policy field 378, and a connection policy field 380. The service name field 364 will correspond to the service to be advertised, and depending on whether the service advertiser is a source device 115 or a sink device 135. The discovery policy field 378 is set to indicate which discovery methods are supported by the display service of the service advertiser. However, the priority for the discovery policy field 378 is not applicable for a service advertiser and should be ignored. The connection policy field 380 indicates the preference or priority for the connection topology for the session. The discovery policy field 378 and the connection policy field 380 may include additional information as described above with reference to FIGS. 3A-3B and Tables 1-4. For example, discovery policy field 378 and connection policy field 380 may be examples of discovery policy field 312 and connection policy field 314 described above. While not shown in Tables 3-4, all or a portion of the connection policy information for a service advertiser may also be included by expanding the existing network role field 372 and the parameters of the network configuration field 374 in the advertise service primitive 302.

In order to invoke the service seek or service advertise methods for an existing infrastructure connection, e.g., a L3 connection, certain L3 display service discovery information may be included in the service.

Figure 3D:
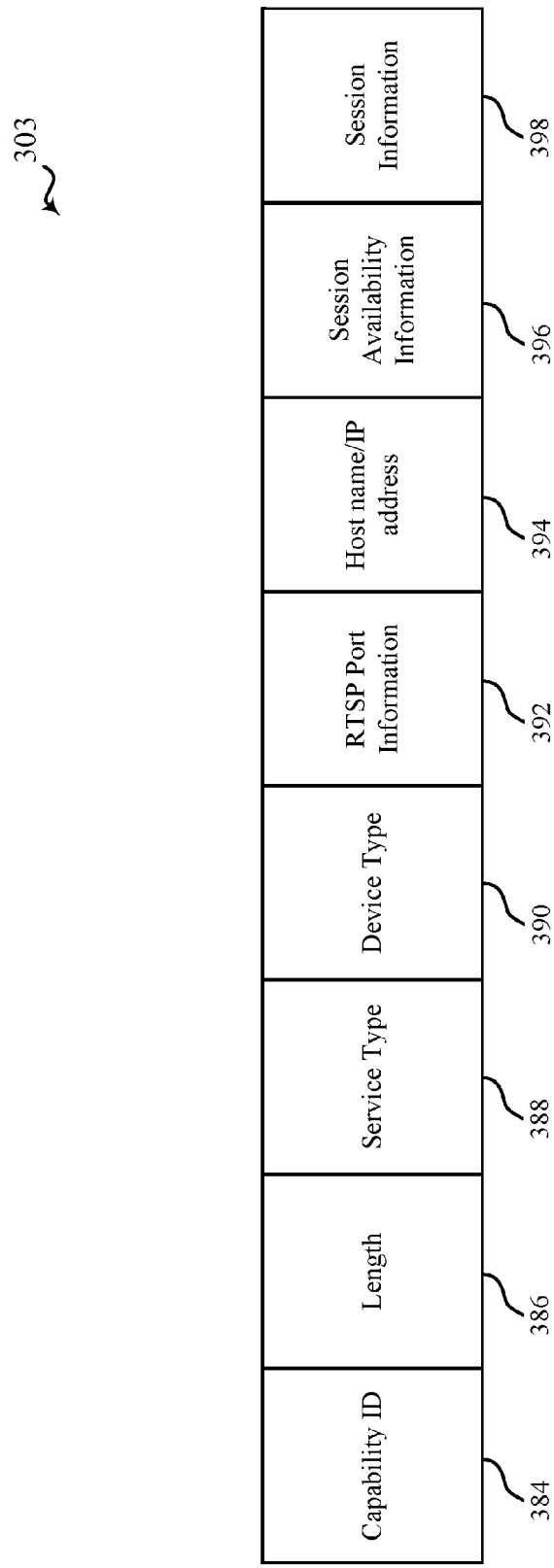
FIG. 3D illustrates an example of L3 display service discovery information in accordance with various aspects of the present disclosure.

FIG. 3D illustrates an example of L3 display service discovery information 303 in accordance with various aspects of the present disclosure. The capability ID field 384 identifies the type of WFD capability supported, and the service type field 388 indicates WFD. The length field 386 indicates the length of the L3 display service discovery information 303. The device displaying the L3 display service discovery information 303 is indicated by the device type field 390. The device may be a source, primary sink, or secondary sink device. The RTSP port information field 392 identifies a transmission control protocol (TCP) port for RTSP at the device. The host name/IP address field 394 provides the host name or local IP address of the device. The session availability information field 396 indicates the number of sessions that are available at the device. The session information field 398 is an optional field that may be shown for remote users to provide certain session information, including a session name, which may include an identification string, and a mode, which may include the operational mode of the device.

The exemplary L3 display service discovery information 303 is summarized in Table 5 below. It may be understood that the field sizes provided for the L3 display service discovery information 303 and Table 5 below are examples, and that the field sizes may be increased or decreased, or be reordered, in other examples. In some examples, one or more fields may be omitted, or additional fields added.

TABLE 5

L3 Display Service Discovery Information

| Field | Size (Octets) | Description |
|---|---|---|
| Capability ID | 1 | Identifying the type of WFD capability |
| Length | 2 | Length is variable and indicates the length of the L3 display service discovery information |
| Service Type | 1 | Value 0 for WFD service<br>Other values are reserved |
| Device Type | 1 | Indicates the role of the device:<br>Source<br>Primary Sink<br>Secondary Sink |
| RTSP Port Information | 2 | Valid TCP port for RTSP |

TABLE 5-continued

L3 Display Service Discovery Information

| Field | Size (Octets) | Description |
|---|---|---|
| Host name/ IP address | variable (max 255 octets) | Host name or local IP address of the device |
| Session Availability Information | 1 | Indicates available number of sessions (if 0, indicates not available for session) |
| Session Information | variable | Optional field, if present specifies string to be shown for remote user for the session. The format of the session information is: name-[value]: mode-[value] where name may include identification string, and mode includes the operational mode |

The L3 display service discovery information provided in Table 5 may also be provided in other formats other than the indicated bitmap. For example, a text record format may be used for the service parameters, for example if service discovery over the infrastructure network is performed using a Bonjour®, or Bonjour®-like, procedure. And, if service discovery over the infrastructure network is performed using UPnP SSDP, then an extensible markup language (XML) format may be used for the service information.

Figure 4:
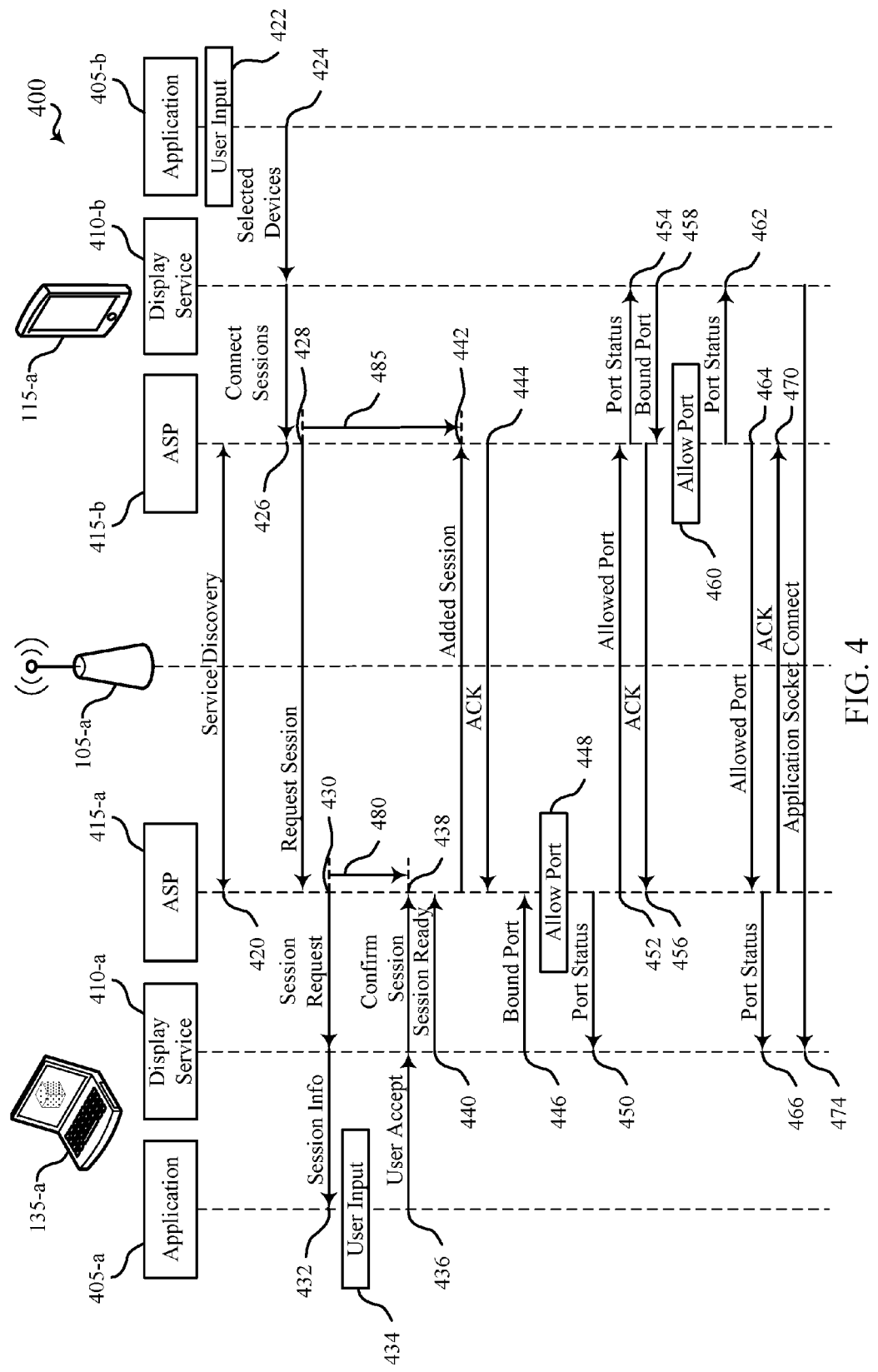
FIG. 4 illustrates an example of a process flow for managing service discovery and topology for multimedia streaming over WLAN connections in accordance with various aspects of the present disclosure.

FIG. 4 illustrates an example of a process flow 400 for managing service discovery and topology for multimedia streaming over WLAN connections in accordance with various aspects of the present disclosure. Process flow 400 may include a source device 115-*a*, a sink device 135-*a*, and an AP 105-*a*, which may be examples of a source device 115, a sink device 135, and an AP 105 described with reference to FIGS. 1-3.

Sink device 135-*a* may advertise services which it supports to other devices. Sink device 135-*a* may include an application 405-*a* that uses multimedia streaming, a display service 410-*a*, and an ASP 415-*a*, which may communicate with each other. Similarly, source device 115-*a* may also include an application 405-*b* that uses multimedia streaming, a display service 410-*b*, and an ASP 415-*b*, which may communicate with each other. Although described with reference to a single sink device 135-*a*, the steps of process flow 400 may be used with a plurality of sink devices 135.

Prior to service discovery 420, each of source device 115-*a* and sink device 135-*a* have established a wired or wireless infrastructure connection with AP 105-*a*. Thus, the process flow 400 includes the exchange of messages and other communications by and between source device 115-*a* and sink device 135-*a* via AP 105-*a*.

The service discovery 420 may be performed over the existing infrastructure connection, which may be an L3 connection over the same IP subnet. The service discovery 420 may be according to other mechanisms and protocols describes throughout this disclosure, including with reference to discovery phase 272 of FIG. 2A and/or discovery phase 272-*a* of FIG. 2B.

First, at an application 405-*b* of the source device 115-*a*, a user input 422 triggers a message identifying selected devices 424 to the display service 410-*b*. User input 422 for example may be a request to stream one or more portions of multimedia content, e.g., audio, video, images, etc., from source device 115-*a* to a certain sink device 135-*a*. Display service 410-*b* then invokes a connect sessions method 426, including among other things a connection policy for the source device 115-*a*. Connect sessions method 426 may then be sent to ASP 415-*b*. ASP 415-*b* then sends a request session message 428 to sink device 135-*a*, which is received by ASP 415-*a*. Request session message 428 may contain information as discussed in greater detail above, including at least an ASP session information field, concerning among other things the preferred connection for the service session. ASP 415-*b* sets a timer 485 to wait for an added session response 442 from ASP 415-*a*.

Receiving the request session message 428, ASP 415-*a* sends a session request 430 to a display service 410-*a* of the sink device 135-*a*. At the same time, ASP 415-*a* sets a timer 480 to wait for a set session ready message 440 from display service 410-*a*. Display service 410-*a* sends a message including the session information 432 to application 405-*a* of the sink device 135-*a*. User input 434 may accept the session request, so that a user accept message 436 is sent to the display service 410-*a* from the application 405-*a*. The display service 410-*a* sends a confirm session message 438 to the ASP 415-*a* of the sink device 135-*a*, resetting timer 480. ASP 415-*a* sends an added session response 442 to the ASP 415-*b* of the source device 115-*a*, in response to a set session ready message 440 from the display service 410-*a*, resetting timer 485. ASP 415-*b* sends an acknowledgement 444. Display service 410-*a* requests the port to be bound 446, ASP 415-*a* allows the port 448, and the port status 450 is provided back to the display service 410-*a*. ASP 415-*a* notifies ASP 415-*b* of the allowed port 452. Display service 410-*b* receives a port status message 454, request the port to be bound 458, which port is allowed 460 by ASP 415-*b* who reports the port status 462 to the display service 410-*b*. ASP 415-*b* sends an allowed port message 464 to ASP 415-*a* who reports port status 466 to display service 410-*a* and sends an acknowledgement 470 back to ASP 415-*b*

Application socket 474 is then connected from display service 410-*b* of the source device 115-*a* to the display service 410-*a* of the sink device 135-*a*, and a multimedia streaming session may commence from source device 115-*a* to sink device 135-*a*.

Figure 5:
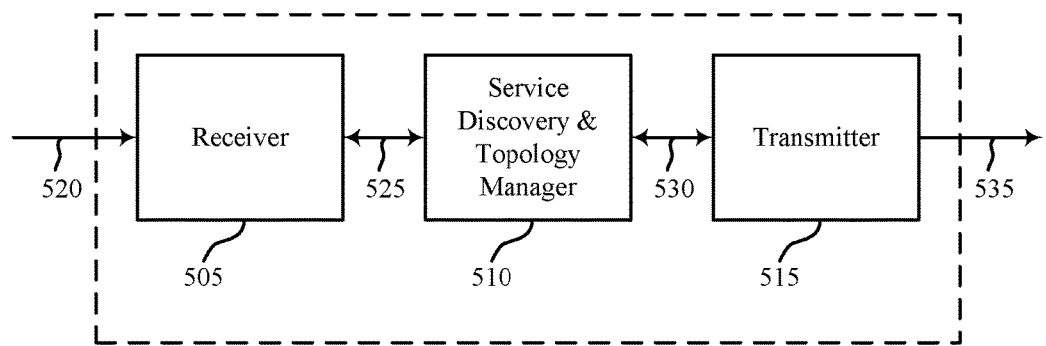
FIGS. 5-7 show block diagrams of a wireless device that supports managing service discovery and topology for multimedia streaming over WLAN connections in accordance with various aspects of the present disclosure.

FIG. 5 shows a block diagram of a wireless device 500 configured for managing service discovery and topology for multimedia streaming over WLAN connections in accordance with various aspects of the present disclosure. Wireless device 500 may be an example of aspects of a source device 115 described with reference to FIGS. 1-4. Wireless device 500 may include a receiver 505, a service discovery and topology manager 510, or a transmitter 515. Wireless device 500 may also include a processor and memory. Each of these components may be in communication with each other.

The receiver 505 may receive information such as packets, user data, or control information associated with various information channels (e.g., control channels, data channels, and information related to managing service discovery and topology for multimedia streaming over WLAN connections, etc.) via communication link 520. Information received at receiver 505 may be passed on to the service discovery and topology manager 510 via communication link 525, and to other components of wireless device 500. In some examples, the receiver 505 may include a circuit or circuitry for receiving information over communication link 520.

The service discovery and topology manager 510 may identify, at a source device of a WLAN, one or more attributes of a first wireless link and a second wireless link between the source device and a sink device of the WLAN, compare the one or more attributes with a source device connection policy associated with a streaming protocol, and determine, at the source device, whether to establish a streaming session with the sink device over the first wireless link or the second wireless link based at least in part on the comparing. In some examples, the service discovery and topology manager 510 may include a circuit or circuitry for identifying or comparing one or more attributes of a wireless link and/or determining whether to establish a streaming session.

The transmitter 515 may transmit information and signals received from other components of wireless device 500, including information received from the service discovery and topology manager 510 via communication link 530, and information received from other components of wireless device 500, via communication link 535. Such information and signals may include packets, user data, or control information associated with various information channels (e.g., control channels, data channels, and information related to managing service discovery and topology for multimedia streaming over WLAN connections, etc.). In some examples, the transmitter 515 may be collocated with the receiver 505 in a transceiver component. The transmitter 515 may include a single antenna, or it may include a plurality of antennas. In some examples, the transmitter 515 may include a circuit or circuitry for receiving information from the service discovery and topology manager 510 via communication link 530 and for transmitting signals via communication link 535.

Figure 6:
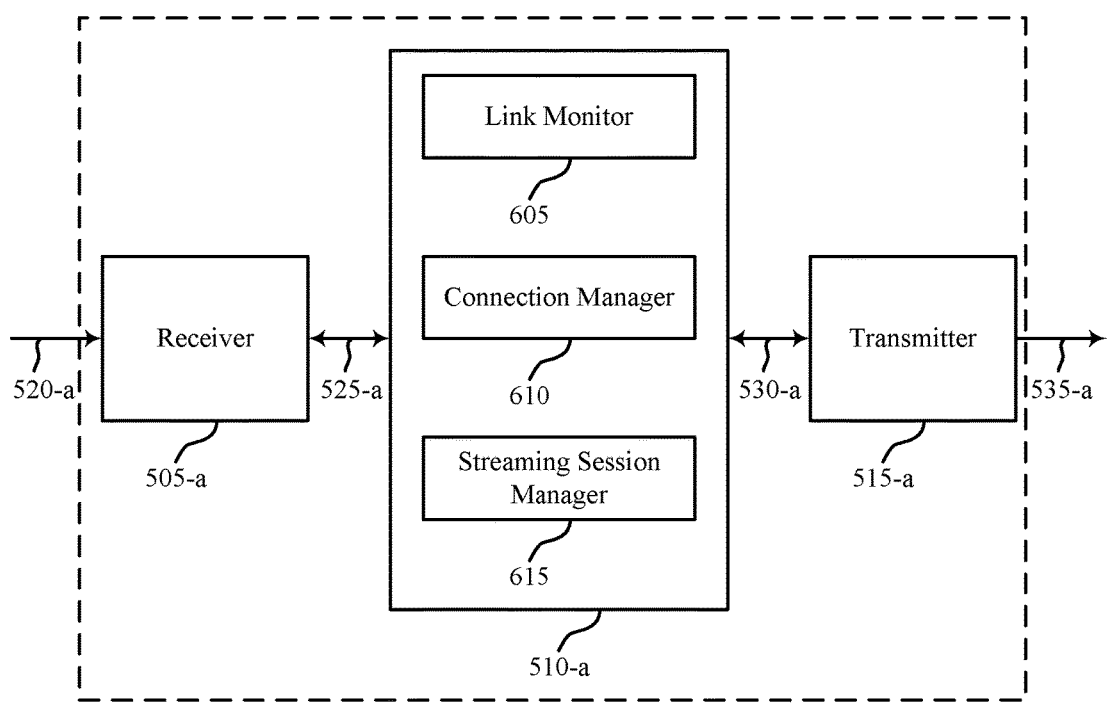

FIG. 6 shows a block diagram of a wireless device 600 for managing service discovery and topology for multimedia streaming over WLAN connections in accordance with various aspects of the present disclosure. Wireless device 600 may be an example of aspects of a wireless device 500 or a source device 115 described with reference to FIGS. 1-5. Wireless device 600 may include a receiver 505-*a*, a service discovery and topology manager 510-*a*, or a transmitter 515-*a*. Wireless device 600 may also include a processor and memory. Each of these components may be in communication with each other. The service discovery and topology manager 510-*a* may also include a link monitor 605, a connection manager 610, and a streaming session manager 615.

The receiver 505-*a* may receive information (e.g., control channels, data channels, and information related to managing service discovery and topology for multimedia streaming over WLAN connections, etc.) via communication link 520-*a* which may be passed on to service discovery and topology manager 510-*a*, including link monitor 605, connection manager 610, and streaming session manager 615, via communication link 525-*a*, and to other components of wireless device 600. The service discovery and topology manager 510-*a* may perform the operations described with reference to FIG. 5. The transmitter 515-*a* may transmit, via communication link 535-*a*, signals received, via communication link 530-*a*, from service discovery and topology manager 510-*a* and from other components of wireless device 600.

The link monitor 605 may identify, at a source device of a WLAN, one or more attributes of a first wireless link and a second wireless link between the source device and a sink device of the WLAN as described with reference to FIGS. 2-4. The link monitor 605 may also perform a link quality test associated with the one or more attributes of the first wireless link to determine a link quality of the first wireless link prior to establishing the streaming session. The link monitor 605 may also receive, from the sink device, one or more link quality metrics associated with the first wireless link. The link monitor 605 may also perform a link quality test associated with the streaming session. In some examples, the link monitor 605 may include a circuit or circuitry for identify one or more attributes of a wireless link, performing a link quality test, or receiving one or more link quality metrics.

The connection manager 610 may compare the one or more attributes with a source device connection policy associated with a streaming protocol as described with reference to FIGS. 2-4. The connection manager 610 may also modify, at the source device, the source device connection policy. In some examples, the source device connection policy comprises one or more of an existing connection parameter, a concurrency support parameter, a multicast support parameter, a supported frequency band parameter, or a minimum link throughput parameter. In some examples, the first wireless link comprises an infrastructure link between the source device and the sink device through an access point of the WLAN. In some examples, the first streaming session may be over a second wireless connection between the source device and the sink device, wherein the second wireless connection comprises a wireless peer-to-peer connection between the source device and the sink device. In some examples, the connection manager 610 may include a circuit or circuitry for comparing one or more attributes or modifying a connection policy.

The streaming session manager 615 may determine, at the source device, whether to establish a streaming session with the sink device over the first wireless link or the second wireless link based at least in part on the comparing as described with reference to FIGS. 2-4. The streaming session manager 615 may also establish the streaming session over the first wireless link. The streaming session manager 615 may also switch the streaming session over the first wireless link to the streaming session over the second wireless link based at least in part on the determining. The streaming session manager 615 may also establish the streaming session over the first wireless link. The streaming session manager 615 may also switch the streaming session over the first wireless link to the streaming session over the second wireless link based at least in part on the modified source device connection policy. In some examples, the streaming session manager 615 may include a circuit or circuitry for determining whether to establish a streaming session over a first or second wireless link, establishing a streaming connection on a wireless link, or for switching a streaming connection from one wireless link to another.

Figure 7:
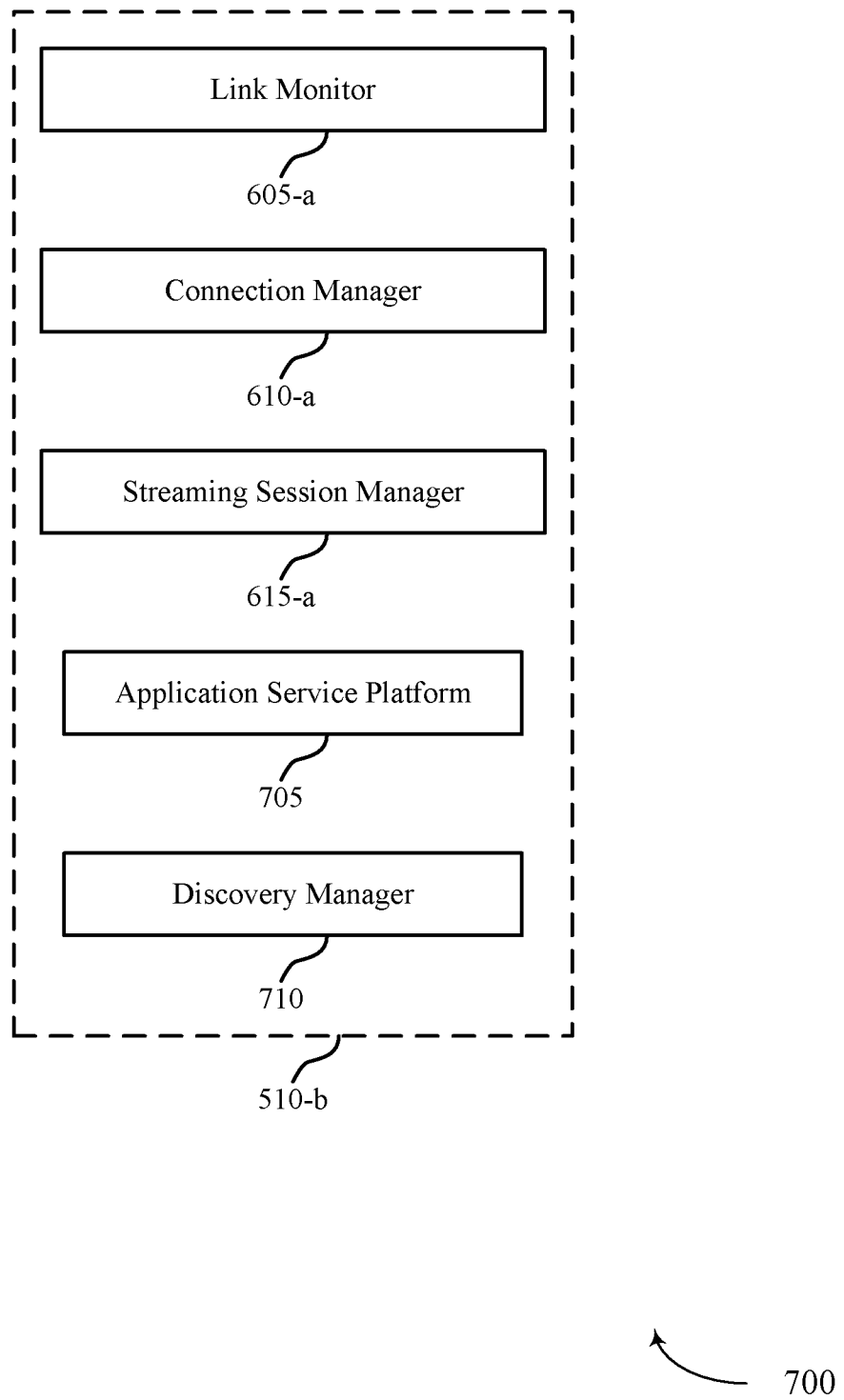

FIG. 7 shows a block diagram 700 of a service discovery and topology manager 510-*b* which may be a component of a wireless device 500 or a wireless device 600 for managing service discovery and topology for multimedia streaming over WLAN connections in accordance with various aspects of the present disclosure. The service discovery and topology manager 510-*b* may be an example of aspects of a service discovery and topology manager 510 described with reference to FIGS. 5-6. The service discovery and topology manager 510-*b* may include a link monitor 605-*a*, a connection manager 610-*a*, and a streaming session manager 615-*a*. Each of these components may perform the functions described with reference to FIG. 6. The service discovery and topology manager 510-*b* may also include an application service platform 705, and a discovery manager 710.

The application service platform 705 may establish an ASP session between the source device and the sink device over the first wireless link as described with reference to FIGS. 2-4. The application service platform 705 may also transmit a streaming session request message to the sink device over the first wireless link. The application service platform 705 may also transmit, from the source device, the source device connection policy. The application service platform 705 may also receive, from the sink device, a sink device connection policy. The application service platform 705 may also transmit, from the source device, the modified source device connection policy to the sink device. In some examples, the application service platform 705 may include a circuit or circuitry for establishing an ASP session, transmitting a streaming session, transmitting a device connection policy, receiving a device connection policy, or transmitting a modified device connection.

The discovery manager 710 may perform a service discovery protocol to identify one or more service advertisers that support the streaming protocol, wherein the one or more service advertisers include the sink device as described with reference to FIGS. 2-4. The discovery manager 710 may also receive a request to establish the first streaming session from an application of the source device, wherein the request comprises a source device discovery policy. The discovery manager 710 may also determine the service discovery protocol to perform based at least in part on the source device discovery policy. In some examples, the source device discovery policy comprises one or more of a supported discovery protocol parameter and a preferred discovery protocol parameter. The discovery manager 710 may also perform the service discovery protocol comprises performing post association discovery using one or more of a mDNS service discovery protocol or a SSDP in a UPnP protocol, or a pre-association discovery using wireless P2P discovery procedure. In some examples, the discovery manager 710 may include a circuit or circuitry for performing a service discovery protocol, receiving a request to establish a streaming session, or determining a service discovery protocol to perform as described.

Figure 8:
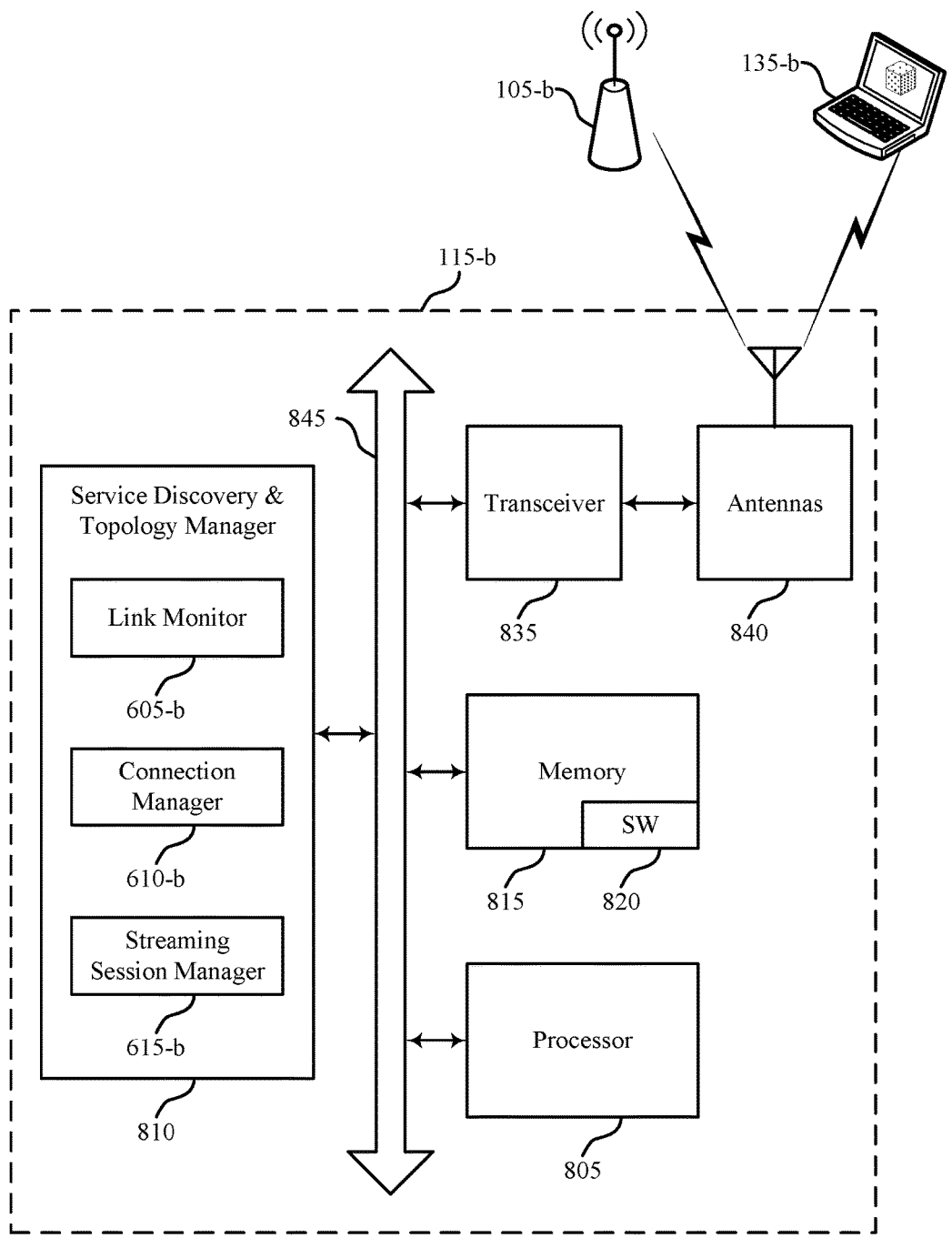
FIG. 8 illustrates a block diagram of a system including a source device that supports managing service discovery and topology for multimedia streaming over WLAN connections in accordance with various aspects of the present disclosure.

FIG. 8 shows a diagram of a system 800 including a source device 115-*b* configured for managing service discovery and topology for multimedia streaming over WLAN connections in accordance with various aspects of the present disclosure. System 800 may include source device 115-*b*, which may be an example of a wireless device 500, a wireless device 600, or a source device 115 described with reference to FIGS. 1, 2 and 5-7. Source device 115-*b* may include a service discovery and topology manager 810, which may be an example of a service discovery and topology manager 510 described with reference to FIGS. 5-7. The service discovery and topology manager 810 may include a link monitor 605-*b*, and connection manager 610-*b*, and a streaming session manager 615-*b*, which may be examples of the link monitor 605, the connection manager 610, and the streaming session manager 615 described with reference to FIGS. 6-7. Source device 115-*b* may also include components for bi-directional voice and data communications including components for transmitting communications and components for receiving communications. For example, source device 115-*b* may communicate bi-directionally with AP 105-*b* or sink device 135-*b*.

Source device 115-*b* may also include a processor 805, and memory 815 (including software (SW 820)), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with an AP 105 or another source device 115. The transceiver 835 may include a modem to modulate the packets and provide the modulated packets to the antenna(s) 840 for transmission, and to demodulate packets received from the antenna(s) 840. While source device 115-*b* may include a single antenna 840, source device 115-*b* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., managing service discovery and topology for multimedia streaming over WLAN connections, etc.). Alternatively, the software/firmware code 820 may not be directly executable by the processor 805 but cause a computer (e.g., when compiled and executed) to perform functions described herein. The processor 805 may include an intelligent hardware device (e.g., a central processing unit (CPU), a microcontroller, an application specific integrated circuit (ASIC), another circuit or collection of circuitry, etc.) adapted to perform some or all of the applicable functions.

The components of wireless device 500, wireless device 600, and service discovery and topology manager 810 may, individually or collectively, be implemented with at least one ASIC adapted to perform some or all of the applicable functions in hardware or using another circuit or collection of circuitry. Alternatively, the functions may be performed by one or more other processing units (or cores), or on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
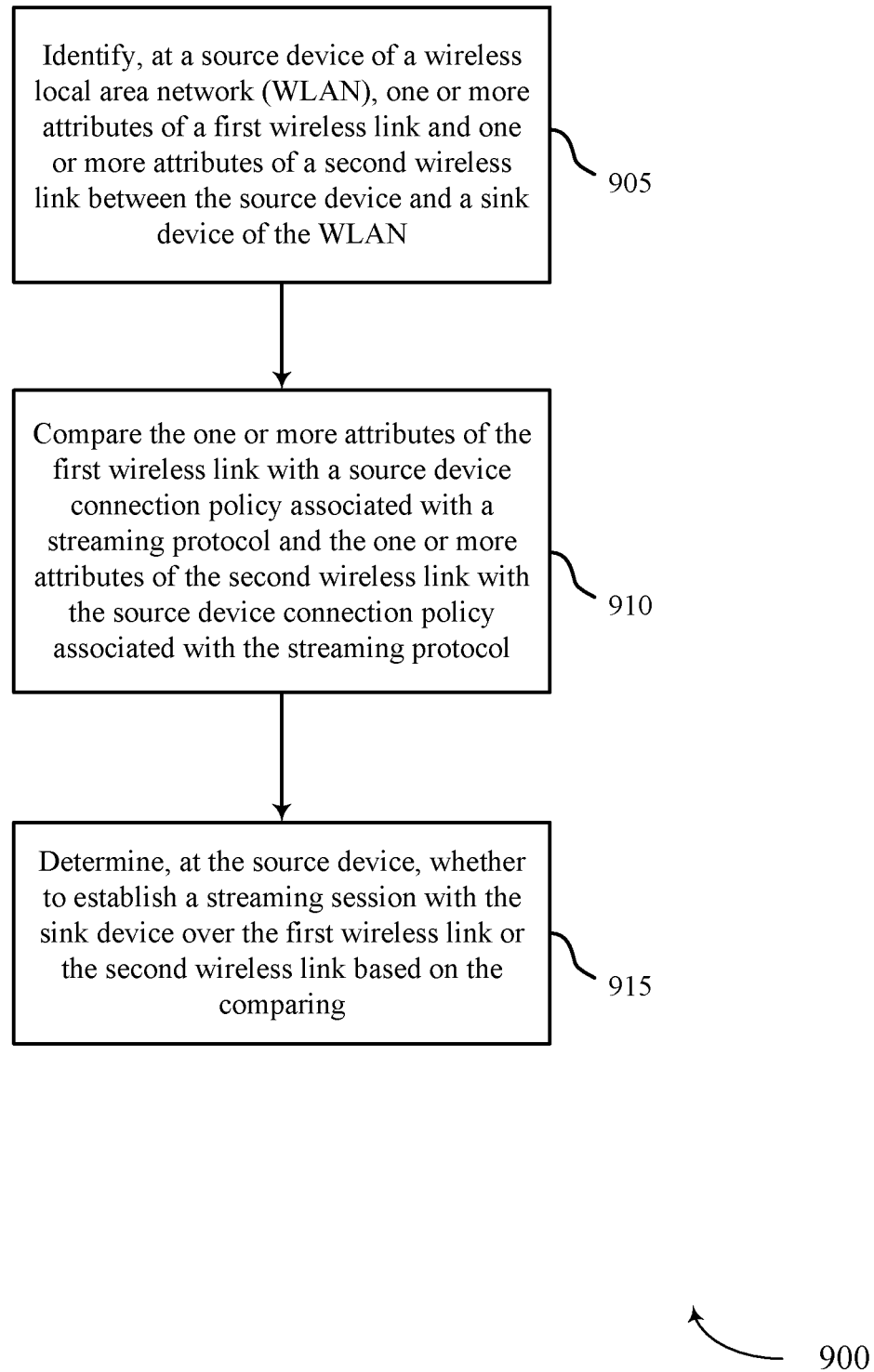
FIGS. 9-11 illustrate methods for managing service discovery and topology for multimedia streaming over WLAN connections in accordance with various aspects of the present disclosure.

FIG. 9 shows a flowchart illustrating a method 900 for managing service discovery and topology for multimedia streaming over WLAN connections in accordance with various aspects of the present disclosure. The operations of method 900 may be implemented by a source device 115 or its components as described with reference to FIGS. 1-8. For example, the operations of method 900 may be performed by the service discovery and topology manager 510 as described with reference to FIGS. 5-8. In some examples, a source device 115 may execute a set of codes to control the functional elements of the source device 115 to perform the functions described below. Additionally or alternatively, the source device 115 may perform aspects the functions described below using special-purpose hardware.

At block 905, the source device 115 may identify, at a source device of a WLAN, one or more attributes of a first wireless link and a second wireless link between the source device and a sink device of the WLAN as described with reference to FIGS. 2-4. In certain examples, the operations of block 905 may be performed by the link monitor 605 as described with reference to FIG. 6.

At block 910, the source device 115 may compare the one or more attributes with a source device connection policy associated with a streaming protocol as described with reference to FIGS. 2-4. For example, the identified one or more attributes of the first wireless link may be associated with a value for the first wireless link associated with a concurrency support parameter, a multicast support parameter, a supported frequency band parameter, or a minimum link throughput parameter. The value associated with the identified one or more attributes for the first wireless link may be compared against the source device connection policy. Similarly, the identified one or more attributes of the second wireless link may be associated with a value for the second wireless link and may be associated with a concurrency support parameter, a multicast support parameter, a supported frequency band parameter, or a minimum link throughput parameter, and may be compared against the source device connection policy. The source device 115 may determine that one of the first wireless link or the second wireless link has satisfied requirements of the source device connection policy, and may select the wireless link whose requirements are satisfied. The source device 115 may determine that one or both of the first wireless link or the second wireless link has satisfied requirements of the source device connection policy, and may pick the wireless link that is preferred when both satisfy the requirement of the source device connection policy, for example according to the preferred connection subfield of the connectivity status and preference bitmap field 338 described with reference to FIG. 3B. In certain examples, the operations of block 910 may be performed by the connection manager 610 as described with reference to FIG. 6.

In some examples, the one or more attributes of the first or second wireless link includes a supported frequency band value (e.g., 2.4 GHz, 5 GHz, or 60 GHz). That is, an ASP of a device (e.g., a connection manager 610) may measure or otherwise assess whether the first or second wireless links support a particular frequency band. A connection policy (e.g., the connection policy described in Table 4) may include preferences indicating which band or bands are preferred and/or supported for a connection. For example, the connection policy may indicate that a 60 GHz band is not supported, that a 5 GHz band is supported, and that a 2.4 GHz band is not preferred. In such an example, if the first wireless link supported a 5 GHz band and the second wireless link supported either a 60 GHz or a 2.4 GHz band, then the device may select the first wireless link to establish a connection. If both wireless links support a band that is preferred by the connection policy, the device may select the first or second wireless link based on some other criteria in the connection policy (e.g., a preferred connection topology).

In some examples, the one or more attributes of the first or second wireless link includes a measured throughput. The measured throughput of the first or second wireless link may be measured in units of Mbps. In some examples, a device connection policy (e.g., the connection policy described in Table 4) may include a minimum required link throughput value that indicates the minimum required throughput for a link that is required for a particular device or service. Accordingly, an ASP of a device (e.g., a connection manager 610) may measure the link throughput of a first wireless link and the link throughput of a second wireless link and compare these values to the minimum required link throughput in the connection policy. If only one of the first and second wireless links satisfies the required minimum link throughput, the device may select the wireless link that satisfies the threshold. If both wireless links satisfy the threshold, the device may select the first or second wireless link based on some other criteria in the connection policy (e.g., a preferred connection topology).

In some examples, the one or more attributes of the first or second wireless link includes an RSSI value. The RSSI value for a wireless link may be measured in dBm. In some examples, a device connection policy (e.g., the connection policy described in Table 4) may include a minimum required link RSSI value that indicates the minimum required RSSI for a link that is required for a particular device or service. Accordingly, an ASP of a device (e.g., a connection manager 610 ) may measure the link RSSI value of a first wireless link and the link RSSI of a second wireless link and compare these values to the minimum required RSSI in the connection policy. If only one of the first and second wireless links satisfies the required minimum link RSSI, the device may select the wireless link that satisfies the threshold. If both wireless links satisfy the threshold, the device may select the first or second wireless link based on some other criteria in the connection policy (e.g., a preferred connection topology).

At block 915, the source device 115 may determine, at the source device, whether to establish a streaming session with the sink device over the first wireless link or the second wireless link based at least in part on the comparing as described with reference to FIGS. 2-4. In certain examples, the operations of block 915 may be performed by the streaming session manager 615 as described with reference to FIG. 6.

Figure 10:
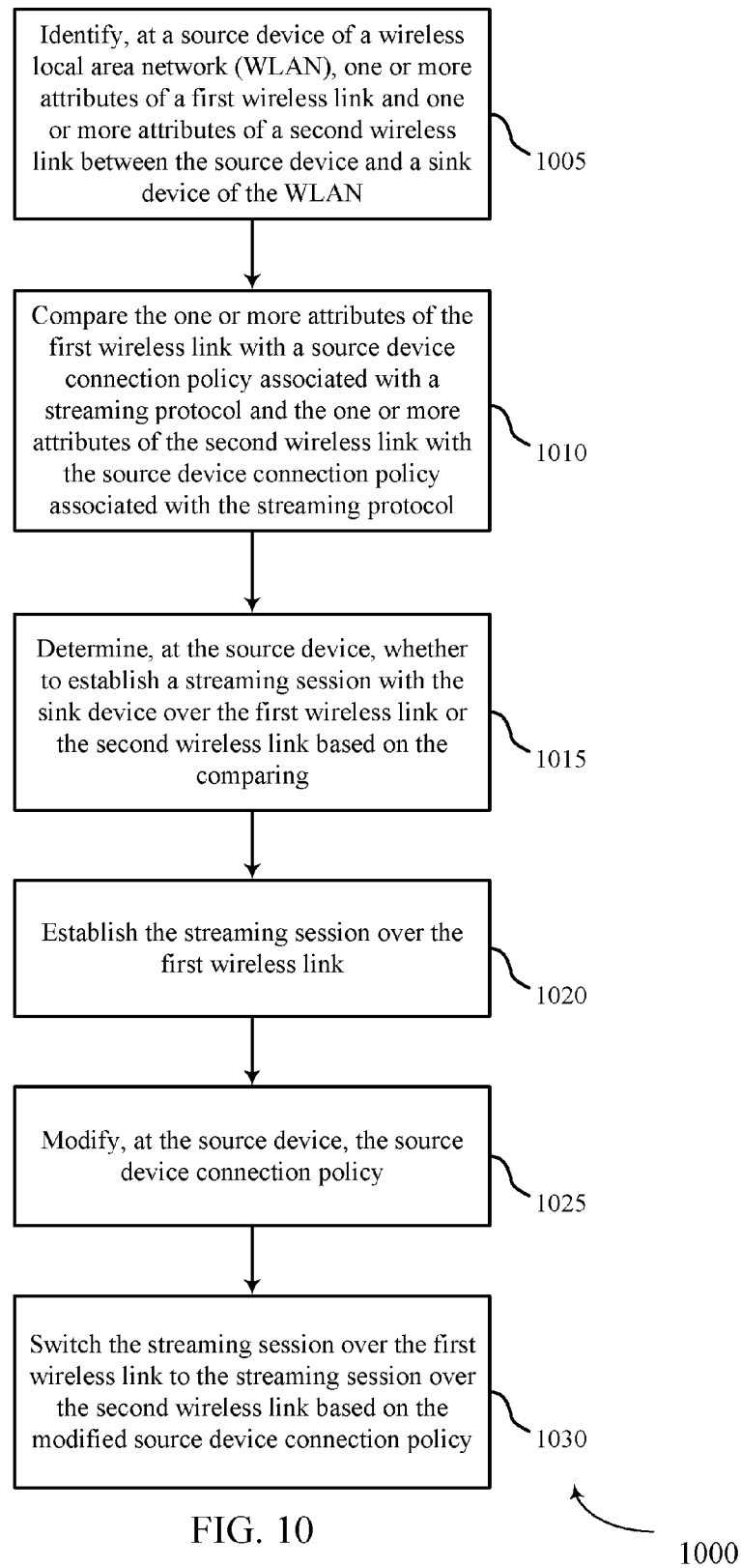

FIG. 10 shows a flowchart illustrating a method 1000 for managing service discovery and topology for multimedia streaming over WLAN connections in accordance with various aspects of the present disclosure. The operations of method 1000 may be implemented by a source device 115 or its components as described with reference to FIGS. 1-8. For example, the operations of method 1000 may be performed by the service discovery and topology manager 510 as described with reference to FIGS. 5-8. In some examples, a source device 115 may execute a set of codes to control the functional elements of the source device 115 to perform the functions described below. Additionally or alternatively, the source device 115 may perform aspects the functions described below using special-purpose hardware. The method 1000 may also incorporate aspects of method 900 of FIG. 9.

At block 1005, the source device 115 may identify, at a source device of a WLAN, one or more attributes of a first wireless link and a second wireless link between the source device and a sink device of the WLAN as described with reference to FIGS. 2-4. In certain examples, the operations of block 1005 may be performed by the link monitor 605 as described with reference to FIG. 6.

At block 1010, the source device 115 may compare the one or more attributes with a source device connection policy associated with a streaming protocol as described with reference to FIGS. 2-4. In certain examples, the operations of block 1010 may be performed by the connection manager 610 as described with reference to FIG. 6.

At block 1015, the source device 115 may determine, at the source device, whether to establish a streaming session with the sink device over the first wireless link or the second wireless link based at least in part on the comparing as described with reference to FIGS. 2-4. In certain examples, the operations of block 1015 may be performed by the streaming session manager 615 as described with reference to FIG. 6.

At block 1020, the source device 115 may establish the streaming session over the first wireless link as described with reference to FIGS. 2-4. In certain examples, the operations of block 1020 may be performed by the streaming session manager 615 as described with reference to FIG. 6.

At block 1025, the source device 115 may modify, at the source device, the source device connection policy as described with reference to FIGS. 2-4. In certain examples, the operations of block 1025 may be performed by the connection manager 610 as described with reference to FIG. 6.

At block 1030, the source device 115 may switch the streaming session over the first wireless link to the streaming session over the second wireless link based at least in part on the modified source device connection policy as described with reference to FIGS. 2-4. In certain examples, the operations of block 1030 may be performed by the streaming session manager 615 as described with reference to FIG. 6.

Figure 11:
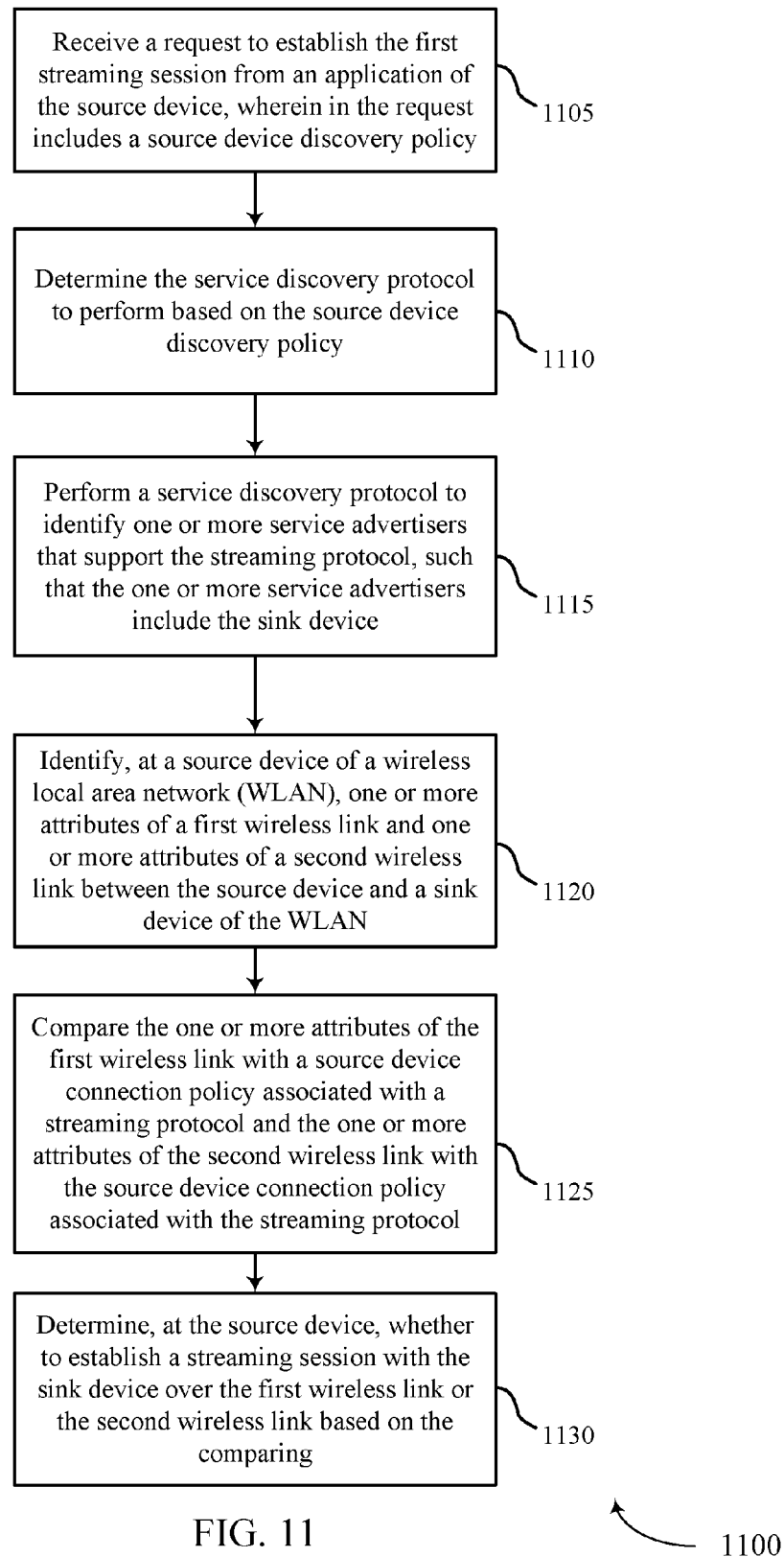

FIG. 11 shows a flowchart illustrating a method 1100 for managing service discovery and topology for multimedia streaming over WLAN connections in accordance with various aspects of the present disclosure. The operations of method 1100 may be implemented by a source device 115 or its components as described with reference to FIGS. 1-8. For example, the operations of method 1100 may be performed by the service discovery and topology manager 510 as described with reference to FIGS. 5-8. In some examples, a source device 115 may execute a set of codes to control the functional elements of the source device 115 to perform the functions described below. Additionally or alternatively, the source device 115 may perform aspects the functions described below using special-purpose hardware. The method 1100 may also incorporate aspects of methods 900 and 1000 of FIGS. 9-10.

At block 1105, the source device 115 may receive a request to establish the first streaming session from an application of the source device, wherein the request comprises a source device discovery policy as described with reference to FIGS. 2-4. In certain examples, the operations of block 1105 may be performed by the discovery manager 710 as described with reference to FIG. 7.

At block 1110, the source device 115 may determine the service discovery protocol to perform based at least in part on the source device discovery policy as described with reference to FIGS. 2-4. In certain examples, the operations of block 1110 may be performed by the discovery manager 710 as described with reference to FIG. 7.

At block 1115, the source device 115 may perform a service discovery protocol to identify one or more service advertisers that support the streaming protocol, wherein the one or more service advertisers include the sink device as described with reference to FIGS. 2-4. In certain examples, the operations of block 1115 may be performed by the discovery manager 710 as described with reference to FIG. 7.

At block 1120, the source device 115 may identify, at a source device of a WLAN, one or more attributes of a first wireless link and a second wireless link between the source device and a sink device of the WLAN as described with reference to FIGS. 2-4. In certain examples, the operations of block 1120 may be performed by the link monitor 605 as described with reference to FIG. 6.

At block 1125, the source device 115 may compare the one or more attributes with a source device connection policy associated with a streaming protocol as described with reference to FIGS. 2-4. In certain examples, the operations of block 1125 may be performed by the connection manager 610 as described with reference to FIG. 6.

At block 1130, the source device 115 may determine, at the source device, whether to establish a streaming session with the sink device over the first wireless link or the second wireless link based at least in part on the comparing as described with reference to FIGS. 2-4. In certain examples, the operations of block 1130 may be performed by the streaming session manager 615 as described with reference to FIG. 6.

Thus, methods 900, 1000, and 1100 may provide for managing service discovery and topology for multimedia streaming over WLAN connections. It should be noted that methods 900, 1000, and 1100 describe possible implementations, and that the operations and the steps may be rearranged or otherwise modified such that other implementations are possible. In some examples, aspects from two or more of the methods 900, 1000, and 1100 may be combined.

The following examples describe certain situations where the herein-described management of multimedia service discovery and topology for multimedia streaming over WLAN connections may be used. In one, a television (TV), acting as a sink device, and a set top box, acting as a source device, may be connected in a home to a home AP. In this example, a multimedia streaming session has already been established over the infrastructure connection between the TV and the set top box. The devices may need to switch to a P2P mode, for example due to poor quality or throughput on the infrastructure connection.

In a second example, a user of a smartphone or other wireless device may want to display a stored picture or movie clip on the TV. In this example, discovery and the multimedia streaming session may be performed over a P2P connection. Where credentials to the AP are also available for the smartphone or other wireless device, the P2P connection may be switched to an infrastructure mode at the direction and preference of the user.

In a third example, a source device 115 may be capable of concurrent P2P and infrastructure connections, while a sink device 135 may operate only in one of a P2P mode or an infrastructure mode. In such case, when a source device is already connected to an AP in an infrastructure mode, the source device 115 may not be able to discover the sink device 135 through a P2P discovery. Likewise, the source device 115 may not be able to discover sink device 135 through an infrastructure discovery when the sink device 135 is already connected to a source device 115 via a P2P connection.

In a fourth example, one or more devices, including source device 115 or sink device 135, may be connected to the AP via Ethernet in the same IP subnet. However, WLAN may be disabled. Discovery over the IP subnet may find and reuse the connection for a multimedia streaming session over the infrastructure connect. If a device is found during discovery over the IP subnet, P2P discovery may be skipped.

In a fifth example, source device 115 and sink device 135 may discover each other via an infrastructure connection. However, the data rate is inadequate for a multimedia streaming session, e.g., because the AP through which source device 115 and sink device 135 are connected does not support an adequate data rate, or the BSS is overloaded, etc. In this example, the source device 115 and sink device 135 may exchange connection preferences parameters after discovery to establish a P2P connection to use for a multimedia streaming session.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Further, in one example, the various illustrative blocks, components, or managers described in connection with the disclosure herein may be implemented or performed using a circuit or circuitry for performing the functions described herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An apparatus for wireless communication, comprising:
    a processor;
    memory in electronic communication with the processor; and
    instructions stored in the memory and operable, when executed by the processor, to cause the apparatus to:
    identify, at a source device of a wireless local area network (WLAN), a plurality of attributes of a first wireless link between the source device and a sink device of the WLAN and a plurality of attributes of a second wireless link between the source device and the sink device;
    transmit, from the source device, a source device connection policy including a preferred connection for at least the second wireless link;
    compare the plurality of attributes of the first wireless link with the source device connection policy associated with a streaming protocol and the plurality of attributes of the second wireless link with the source device connection policy associated with the streaming protocol; and
    determine, at the source device, whether to establish a streaming session with the sink device over the first wireless link or the second wireless link based at least in part on the comparing.

2. The apparatus of claim 1, wherein the instructions are further operable to cause the processor to:
    establish the streaming session over the first wireless link; and switch the streaming session over the first wireless link to the streaming session over the second wireless link based at least in part on the determining.

3. The apparatus of claim 1, wherein the instructions are further operable to cause the processor to:
    establish an application service platform (ASP) session between the source device and the sink device over the first wireless link based at least in part on the preferred connection; and
    transmit a streaming session request message to the sink device over the first wireless link.

4. The apparatus of claim 1, wherein the instructions are further operable to cause the processor to:
    receive, from the sink device, a sink device connection policy.

5. The apparatus of claim 1, wherein the instructions are further operable to cause the processor to:
    modify, at the source device, the source device connection policy; and
    transmit, from the source device, the modified source device connection policy to the sink device.

6. The apparatus of claim 1, wherein the instructions are further operable to cause the processor to:
    establish the streaming session over the first wireless link;
    modify, at the source device, the source device connection policy; and
    switch the streaming session over the first wireless link to the streaming session over the second wireless link based at least in part on the modified source device connection policy.

7. The apparatus of claim 1, wherein the instructions are further operable to cause the processor to:
    perform a link quality test associated with the plurality of attributes of the first wireless link to determine a link quality of the first wireless link prior to establishing the streaming session.

8. The apparatus of claim 1, wherein the instructions are further operable to cause the processor to:
    receive, from the sink device, one or more link quality metrics associated with the first wireless link.

9. The apparatus of claim 1, wherein the instructions are further operable to cause the processor to:
    perform a link quality test associated with the streaming session.

10. The apparatus of claim 1, wherein the source device connection policy comprises one or more of an existing connection parameter, a concurrency support parameter, a multicast support parameter, a supported frequency band parameter, or a minimum link throughput parameter.

11. The apparatus of claim 1, wherein:
    the instructions operable to cause the processor to compare the plurality of attributes of the first wireless link with the source device connection policy comprise instructions operable to cause the processor to:
    identify a preference of the source device connection policy corresponding to the identified one or more attributes of the first wireless link; and
    determine whether the identified plurality of attributes of the first wireless link satisfy the preference of the source device connection policy, and wherein:
    the instructions operable to cause the processor to compare the plurality of attributes of the second wireless link with the source device connection policy comprise instructions operable to cause the processor to:
    identify the preference of the source device connection policy corresponding to the identified plurality of attributes of the second wireless link; and
    determine whether the identified plurality of attributes of the second wireless link satisfy the preference of the source device connection policy.

12. The apparatus of claim 11, wherein:
    the plurality of attributes of the first wireless link or the second wireless link comprise a supported frequency band, a link throughput, or a received signal strength indication (RSSI);
    the preference of the source device connection policy comprises a predetermined threshold associated with the supported frequency band, the link throughput, or the RSSI; and
    the instructions operable to cause the processor to determine whether the identified plurality of attributes of the first wireless link or the second wireless link satisfy the preference of the source device connection policy comprises instructions operable to cause the processor to:
    determine whether the supported frequency band, the link throughput, or the RSSI exceeds the predetermined threshold.

13. The apparatus of claim 1, wherein the instructions are further operable to cause the processor to:
    perform a service discovery protocol to identify one or more service advertisers that support the streaming protocol, wherein the one or more service advertisers include the sink device.

14. The apparatus of claim 13, wherein the instructions are further operable to cause the processor to:
    receive a request to establish the streaming session from an application of the source device, wherein the request comprises a source device discovery policy; and
    determine the service discovery protocol to perform based at least in part on the source device discovery policy.

15. The apparatus of claim 14, wherein the source device discovery policy comprises one or more of a supported discovery protocol parameter and a preferred discovery protocol parameter.

16. The apparatus of claim 13, wherein the instructions are further operable to cause the processor to:
    perform post association discovery using one or more of a multicast domain name system (mDNS) service discovery protocol or a simple service discovery protocol (SSDP) in a universal plug and play (UPnP) protocol, or a pre-association discovery using wireless peer-to-peer (P2P) discovery procedure.

17. The apparatus of claim 13, wherein the first wireless link comprises an infrastructure link between the source device and the sink device through an access point of the WLAN.

18. The apparatus of claim 1, wherein the streaming session is over a second wireless connection between the source device and the sink device, and wherein the second wireless connection comprises a wireless peer-to-peer connection between the source device and the sink device.

19. An apparatus for wireless communication, comprising:
    a link monitor circuit for identifying, at a source device of a wireless local area network (WLAN), a plurality of attributes of a first wireless link between the source device and a sink device of the WLAN and a plurality of attributes of a second wireless link between the source device and the sink device;
    a transmitter circuit for transmitting, from the source device, a source device connection policy indicating a preferred connection for at least the second wireless link;

a connection manager circuit for comparing the plurality of attributes of the first wireless link with the source device connection policy associated with a streaming protocol and the plurality of attributes of the second wireless link with the source device connection policy associated with the streaming protocol; and a streaming session manager circuit for determining, at the source device, whether to establish a streaming session with the sink device over the first wireless link or the second wireless link based at least in part on the comparing.

20. The apparatus of claim 19, further comprising:
a streaming session manager circuit for establishing the streaming session over the first wireless link; and
a streaming session manager circuit for switching the streaming session over the first wireless link to the streaming session over the second wireless link based at least in part on the determining.

21. The apparatus of claim 19, further comprising:
a streaming session manager circuit for establishing the streaming session over the first wireless link;
a connection manager circuit for modifying, at the source device, the source device connection policy; and
a streaming session manager circuit for switching the streaming session over the first wireless link to the streaming session over the second wireless link based at least in part on the modified source device connection policy.

22. The apparatus of claim 19, further comprising:
a link monitor circuit for performing a link quality test associated with the attributes of the first wireless link to determine a link quality of the first wireless link prior to establishing the streaming session.

23. The apparatus of claim 19, further comprising:
a discovery manager circuit for performing a service discovery protocol to identify one or more service advertisers that support the streaming protocol, wherein the one or more service advertisers include the sink device.

24. A method of wireless communication, comprising:
identifying, at a source device of a wireless local area network (WLAN), a plurality of attributes of a first wireless link between the source device and a sink device of the WLAN and a plurality of attributes of a second wireless link between the source device and the sink device;
transmitting, from the source device, a source device connection policy including a preferred connection for at least the second wireless link;
comparing the plurality of attributes of the first wireless link with the source device connection policy associated with a streaming protocol and the plurality of attributes of the second wireless link with the source device connection policy associated with the streaming protocol; and determining, at the source device, whether to establish a streaming session with the sink device over the first wireless link or the second wireless link based at least in part on the comparing.

25. The method of claim 24, further comprising:
establishing the streaming session over the first wireless link; and
switching the streaming session over the first wireless link to the streaming session over the second wireless link based at least in part on the determining.

26. The method of claim 24, further comprising:
modifying, at the source device, the source device connection policy; and
transmitting, from the source device, the modified source device connection policy to the sink device.

27. The method of claim 24, further comprising:
performing a link quality test associated with the plurality of attributes of the first wireless link to determine a link quality of the first wireless link prior to establishing the streaming session.

28. The method of claim 24, further comprising:
performing a service discovery protocol to identify one or more service advertisers that support the streaming protocol, wherein the one or more service advertisers include the sink device.

29. A non-transitory computer-readable medium storing code for wireless communication, the code comprising instructions executable to:
identify, at a source device of a wireless local area network (WLAN), a plurality of attributes of a first wireless link between the source device and a sink device of the WLAN and a plurality of attributes of a second wireless link between the source device and the sink device;
transmit, from the source device, a source device connection policy including a preferred connection for at least the second wireless link;
compare the plurality of attributes of the first wireless link with the source device connection policy associated with a streaming protocol and the plurality of attributes of the second wireless link with the source device connection policy associated with the streaming protocol; and
determine, at the source device, whether to establish a streaming session with the sink device over the first wireless link or the second wireless link based at least in part on the comparing.

30. The non-transitory computer-readable medium of claim 29, wherein the instructions are further executable to:
establish the streaming session over the first wireless link; and
switch the streaming session over the first wireless link to the streaming session over the second wireless link based at least in part on the determining.

* * * * *